(12) United States Patent
Chang et al.

(10) Patent No.: US 8,771,403 B2
(45) Date of Patent: Jul. 8, 2014

(54) METHOD AND SYSTEM FOR CAPTURING CARBON DIOXIDE AND/OR SULFUR DIOXIDE FROM GAS STREAM

(71) Applicants: Shih-Ger Chang, El Cerrito, CA (US); Yang Li, El Cerrito, CA (US); Xinglei Zhao, Albany, CA (US)

(72) Inventors: Shih-Ger Chang, El Cerrito, CA (US); Yang Li, El Cerrito, CA (US); Xinglei Zhao, Albany, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 13/757,550

(22) Filed: Feb. 1, 2013

(65) Prior Publication Data
US 2013/0139695 A1 Jun. 6, 2013

Related U.S. Application Data

(63) Continuation of application No. PCT/US2011/049240, filed on Aug. 25, 2011.

(60) Provisional application No. 61/379,454, filed on Sep. 2, 2010.

(51) Int. Cl.
*B01D 53/14* (2006.01)

(52) U.S. Cl.
USPC ............ 95/183; 423/228; 423/229; 95/236; 96/234

(58) Field of Classification Search
CPC ......... B01D 53/00; B01D 53/10; B01D 53/14
USPC ............................ 96/235; 423/230, 228, 229
See application file for complete search history.

(56) References Cited

U.S. PATENT DOCUMENTS

| | | | |
|---|---|---|---|
| 2,043,109 A * | 6/1936 | McKee et al. .............. | 423/437.1 |
| 4,094,957 A | 6/1978 | Sartori et al. | |
| 4,217,237 A | 8/1980 | Sartori et al. | |
| 4,567,294 A | 1/1986 | Dressel et al. | |

(Continued)

FOREIGN PATENT DOCUMENTS

| WO | WO03/095071 | * 11/2003 | ............ B01D 53/14 |
|---|---|---|---|
| WO | 03/095071 | 11/2013 | |

OTHER PUBLICATIONS

Biopact, "Alstom, EPRI, We Energies to pilot chilled ammonia process to capture CO2," Nature Blog Network, Mar. 1, 2008, 4 pages.

(Continued)

*Primary Examiner* — Duane Smith
*Assistant Examiner* — Joubert X Glover
(74) *Attorney, Agent, or Firm* — Weaver Austin Villeneuve & Sampson LLP

(57) ABSTRACT

The present invention provides a system for capturing $CO_2$ and/or $SO_2$, comprising: (a) a $CO_2$ and/or $SO_2$ absorber comprising an amine and/or amino acid salt capable of absorbing the $CO_2$ and/or $SO_2$ to produce a $CO_2$- and/or $SO_2$-containing solution; (b) an amine regenerator to regenerate the amine and/or amino acid salt; and, when the system captures $CO_2$, (c) an alkali metal carbonate regenerator comprising an ammonium catalyst capable catalyzing the aqueous alkali metal bicarbonate into the alkali metal carbonate and $CO_2$ gas. The present invention also provides for a system for capturing $SO_2$, comprising: (a) a $SO_2$ absorber comprising aqueous alkali metal carbonate, wherein the alkali metal carbonate is capable of absorbing the $SO_2$ to produce an alkali metal sulfite/sulfate precipitate and $CO_2$.

36 Claims, 11 Drawing Sheets

(56) References Cited

U.S. PATENT DOCUMENTS

| | | | |
|---|---|---|---|
| 4,739,866 A | 4/1988 | Reik et al. | |
| 4,814,104 A | 3/1989 | Kubek et al. | |
| 5,618,506 A | 4/1997 | Suzuki et al. | |
| 5,744,110 A | 4/1998 | Mimura et al. | |
| 5,904,908 A | 5/1999 | Suzuki et al. | |
| 6,436,174 B1 * | 8/2002 | Grossmann et al. | 95/191 |
| 6,872,371 B2 * | 3/2005 | Hakka et al. | 423/239.1 |
| 7,056,482 B2 | 6/2006 | Hakka et al. | |
| 7,255,842 B1 | 8/2007 | Yeh et al. | |
| 7,601,315 B2 | 10/2009 | Ouimet | |
| 7,641,717 B2 | 1/2010 | Gal | |
| 7,709,635 B2 | 5/2010 | David, Jr. | |
| 7,744,838 B2 | 6/2010 | David, Jr. | |
| 7,776,296 B2 | 8/2010 | Sarlis et al. | |
| 7,819,932 B2 | 10/2010 | Rhinesmith et al. | |
| 7,866,638 B2 | 1/2011 | Neumann et al. | |
| 7,901,487 B2 | 3/2011 | Rochelle et al. | |
| 8,070,856 B2 | 12/2011 | Rochelle et al. | |
| 8,119,091 B2 | 2/2012 | Keith et al. | |
| 8,308,849 B2 | 11/2012 | Gal et al. | |
| 8,343,445 B2 | 1/2013 | Liu et al. | |
| 8,414,853 B2 | 4/2013 | Liu et al. | |
| 2005/0194561 A1 | 9/2005 | Davis, Jr. | |
| 2007/0044658 A1 | 3/2007 | Rochelle et al. | |
| 2010/0025634 A1 | 2/2010 | Bravo et al. | |
| 2010/0092359 A1 * | 4/2010 | Svendsen et al. | 423/230 |

OTHER PUBLICATIONS

Powerspan, "ECO-CO2 Capture," Powerspan, Clean Energy Technology, copyright 2000-2013, 1 page.

Powerspan, "Power Plant with ECO-$SO_2$ and $ECO_2$ System Installed," Powerspan, Clean Energy Technology, downloaded on Oct. 1, 2013, 1 page.

International Search Report and Written Opinion mailed Jan. 17, 2012, issued in Application No. PCT/US 11/049240.

First AU Examination Report dated Jan. 17, 2014, issued in Application No. 2011296309.

Second AU Examination Report dated Jan. 30, 2014, issued in Application No. 2011296309.

* cited by examiner

A

B

METHOD AND SYSTEM FOR CAPTURING CARBON DIOXIDE AND/OR SULFUR DIOXIDE FROM GAS STREAM

CROSS-REFERENCE TO RELATED APPLICATIONS

This application is a continuation of International Patent Application No. PCT/US2011/049240, filed Aug. 25, 2011 (now International Publication No. WO 2012/030630, published Mar. 8, 2012); which claims priority to U.S. Provisional Patent Application Ser. No. 61/379,454, filed Sep. 2, 2010; which are incorporated by reference herein in their entirety.

STATEMENT OF GOVERNMENTAL SUPPORT

The invention was made with government support under Contract No. DE-AC02-05CH11231 awarded by the U.S. Department of Energy. The government has certain rights in the invention.

FIELD OF THE INVENTION

This invention relates generally to emissions abatement processes and to processes that sequester carbon dioxide.

BACKGROUND OF THE INVENTION

Greenhouse gases, primarily carbon dioxide are emitted to the atmosphere, causing an effect in which heat reflected from the earth's surface is kept from escaping into space. Thus, there is concern that the atmospheric temperature will rise to cause global climate change. The primary options for carbon dioxide mitigation are improved fuel efficiency, use of low carbon fuels or alternative power sources, and carbon sequestration. The latter entails the capture and storage of carbon dioxide that would otherwise be emitted to the atmosphere. The greenhouse gases can be most effectively captured at the point of emission. The captured carbon dioxide can be stored in underground reservoirs.

Pulverized coal (PC) power plants are widely used for power. Flue gas produced from PC plants consists of about 12%-15% $CO_2$ and 80%-85% nitrogen with the remainder mostly oxygen plus a trace amount of $SO_2$, $NO_x$, CO, and mercury. This $CO_2$ concentration is far too low to be sequestered directly; therefore, it must first be concentrated to over 90%, or near purity, in order to be disposed of economically. The largest costs in carbon sequestration are those associated with capturing and concentrating the carbon dioxide from the flue gas at the source. The capture cost could account for more than two thirds of the sequestration cost. In traditional amine or amino acid salt based $CO_2$ scrubbing process, $SO_2$ could be removed by a flue gas desulfurization (FGD) process first to avoid the reaction of $SO_2$ with amine or amino acid salt, resulting in the formation of heat stable salts, which cannot be regenerated by heat treatment.

Approaches being investigated for the capture and separation of carbon dioxide from flue gas streams include solvent, sorbent, membrane, chemical looping, oxy-combustion, and biological fixation-based approaches.

However, currently the state-of-the-art technologies for existing PC power plants are essentially limited to the solvent approach involving the use of amine absorbents. Monoethanolamine (MEA) has been comprehensively studied and successfully used for $CO_2$ separation in natural gas purification. However, the MEA process suffers many drawbacks if used for the capture of $CO_2$ from coal-fired power plants. These include: (1) high energy consumption (about 4.0-4.5 GJ/ton $CO_2$) during solvent regeneration, (2) high carbamate decomposition temperatures (100° C.-120° C.), (3) low $CO_2$ loading capacity (0.25-0.35 mol $CO_2$/mol MEA), (4) high absorbent makeup rate due to amine degradation by $SO_2$, $NO_x$, HCl and oxygen in flue gas, and (5) high equipment corrosion rate, particularly when a high concentration of MEA is used.

A current commercial process involves using an inhibited 30 wt. % MEA for the capture of $CO_2$ from flue gases. The use of a mixture of corrosion inhibitors with high concentration of MEA allows the use of carbon steel and gives the process a smaller reboiler steam demand than the processes employing 20% MEA. Preliminary analysis indicates that $CO_2$ capture via MEA scrubbing and compression to 2,200 psi could raise the cost of electricity from a new supercritical PC power plant by 65 percent, from 5.0 cents per kilowatt-hour to 8.25 cents per kilowatt-hour.

In view of the drawbacks of MEA for $CO_2$ capture, extensive efforts are being spent to develop a more cost-effective absorbent than MEA. Alternatives include MHI/KEPCO's KS-1, 2, and 3 (sterically hindered amines); Cansolv® Absorbent DC101™ (tertiary amines with a promoter); HTC Purenergy's mixed amine solvent; IFP's Castor; and Canadian's PSR. The hindered amines were claimed to have better properties than MEA, in terms of solvent regeneration energy consumption and corrosion rate.

Alternatively, amino acid salts and inorganic alkali are being tested for $CO_2$ absorption. The advantages of amino acid salts include no chemical loss from vaporization and low degradation (less sensitive to oxidation by oxygen). Inorganic alkali is chemically stable, but the $CO_2$ absorption kinetic is inferior to amines. Activators had previously been used with potassium carbonate to improve $CO_2$ absorption mass transfer and inhibit corrosion. UOP's Benfield process (over 675 units worldwide) and Exxon's Flexsorb HP process involve hindered amine as activator. These systems were mainly used for recovering $CO_2$ from industrial gas streams and are known as activated hot potassium carbonate (AHPC). Likewise, the blending of piperazine with potassium carbonate to increase $CO_2$ absorption kinetics has been studied.

Two aqueous ammonia processes have recently been developed—Alstom's CAP (Chilled Ammonia Process) and Powerspan's ECO2. These processes take advantage of $NH_3$'s low cost and high $CO_2$ loading capacity. Each of them has its own unique approach to overcome the problem of $NH_3$ loss due to its high volatility. The Chilled Ammonia Process reduces $NH_3$ emission during $CO_2$ absorption by cooling the flue gas to very low temperature. The scaled-up demonstration of the Chilled Ammonia Process is being conducted by Alstom Power, EPRI, and We Energies at the Pleasant Prairie power plant, Wisconsin; also by Alstom Power, American Electric Power, and EPRI at Mountaineer Plant in New Haven, W.Va. On the other hand, the ECO2 Aqueous Ammonia Process captures $NH_3$ emitted from the absorber to produce a dilute solution of $NH_3$, and uses it upstream in the ECO system for $SO_2$ absorption. As a result, $NH_3$ loss is not wasted in the $CO_2$ capture process. Powerspan is conducting further development of $ECO_2$ at NRG's WA Parish plant near Sugar Land, Tex.

Ionic liquids have also been studied for $CO_2$ capture because of their advantageous properties including high thermal stability, low vapor pressures, nonflammability, and non-toxicity.

The following patents and patent applications are directed to such related technology: U.S. Pat. Nos. 4,567,294; 4,217,237; 4,094,957; 4,217,237; 4,739,866; 4,814,104; 5,618,506;

5,744,110; 5,904,908; 7,056,482; 7,255,842; 7,601,315; 7,709,635; 7,744,838; U.S. patent application Ser. No. 10/551,834, filed Apr. 1, 2004; Ser. No. 10/548,853, filed Mar. 4, 2004; Ser. No. 11/371,924, filed Mar. 10, 2006; Ser. No. 11/046,561, filed Jan. 26, 2005; Ser. No. 12/622,947, filed Nov. 20, 2009; Ser. No. 12/459,685, filed Jul. 6, 2009; Ser. No. 12/488,230, filed Jun. 19, 2009; Ser. No. 12/406,289, filed Mar. 18, 2009; Ser. No. 12/406,360, filed Mar. 18, 2009; Ser. No. 12/101,087, filed Apr. 10, 2008; Ser. No. 11/632,537, filed Apr. 12, 2005, and Ser. No. 12/448,252, filed Dec. 4, 2009; and PCT Patent Application Pub. No. WO 03/095071A1.

WO 03/095071 A1 and U.S. 2010/0092359 A1 disclose a method for capturing $CO_2$ from exhaust gas in an absorber, wherein the $CO_2$ containing gas is passed through an aqueous absorbent slurry wherein said aqueous absorbent slurry comprises an inorganic alkali carbonate, bicarbonate and at least one of an absorption promoter and a catalyst, and wherein the $CO_2$ is converted to solids by precipitation in the absorber, said slurry having the precipitated solids is conveyed to a separating device, in which the solids are separated off, essentially all of at least one of the absorption promoter and catalyst is recycled together with the remaining aqueous phase to the absorber. This disclosed method has the problem of plugging in the absorber.

SUMMARY OF THE INVENTION

The present invention provides a system for capturing $CO_2$, comprising: (a) a $CO_2$ absorber comprising an amine and/or amino acid salt, wherein the amine and/or amino acid salt is capable of absorbing the $CO_2$ to produce a $CO_2$-containing solution; (b) an amine regenerator comprising an aqueous alkali metal carbonate capable of extracting the $CO_2$ from the $CO_2$-containing solution to form an alkali metal bicarbonate solid and regenerate the amine and/or amino acid salt; and (c) an alkali metal carbonate regenerator comprising an ammonium catalyst capable catalyzing the aqueous alkali metal bicarbonate into the alkali metal carbonate and $CO_2$ gas. The amine and/or amino acid salt can be in an aqueous solution or an organic solution. The ammonium catalyst comprises ammonium carbonate, ammonium bicarbonate, ammonium hydroxide, or ammonium carbamate, or a mixture thereof. Alkali metal bicarbonate solid produced in an amine regenerator can be transferred as a form of slurry and/or aqueous solution from an amine to alkali metal regenerators by controlling water content and temperature, but preferably as a concentrated aqueous solution.

The present invention also provides a system for capturing $SO_2$, comprising: (a) a $SO_2$ absorber comprising an amine and/or amino acid salt, wherein the amine and/or amino acid salt is capable of absorbing the $SO_2$ to produce a $SO_2$-containing solution; and (b) an amine regenerator comprising an aqueous alkali metal carbonate capable of forming an alkali metal sulfite/sulfate precipitate and regenerating the amine and/or amino acid salt. The amine and/or amino acid salt can be in an aqueous solution or an organic solution. The present invention also provides for a system comprising both the system for capturing $CO_2$ and the system for capturing $SO_2$. The amine regenerator and $SO_2$ absorber can be separate or they can be the same. The $CO_2$ absorber and $SO_2$ absorber can be separate absorbers or they can be the same absorber.

The present invention also provides a system for capturing $SO_2$, comprising: (a) a $SO_2$ absorber comprising aqueous alkali metal carbonate, wherein the alkali metal carbonate is capable of absorbing the $SO_2$ to produce an alkali metal sulfite/sulfate precipitate and $CO_2$. The present invention also provides for a system comprising both the system for capturing $CO_2$ and the system for capturing $SO_2$. The amine regenerator and $SO_2$ absorber can be separate or they can be the same reaction mixture, or reaction chamber or vessel. In some embodiments of the invention, the alkali metal sulfite/sulfate precipitate can be optionally separated, and further converted to ammonium sulfite/sulfate which is a commercially valuable product.

In some embodiments of the invention, the $CO_2$ and/or $SO_2$ captured are from or in a gas stream or flue gas. In some embodiments of the invention, the alkali metal is potassium, sodium or lithium. Each reaction takes place in a reaction mixture which can be in a reaction chamber or vessel.

Many benefits can be realized by transferring $CO_2$ and/or $SO_2$, captured from a gas stream, from one solvent to another solvent sequentially by chemical methods before the final solvent is thermally regenerated. These solvents can be designed separately according to the different requirements of the absorption and the regeneration processes. The present invention provides a system for the removal of $CO_2$ and $SO_2$ from a gas stream that uses a solvent transformation approach to reduce solvent regeneration energy demand. The system comprises: (a) an absorber comprising an amine and/or amino acid aqueous solution, (b) an amine/amino acid salt regenerator, such as an aqueous solution comprising an alkali metal carbonate salt, which is capable of regenerating amine/amino acid salts while producing alkali metal bicarbonate precipitate, and (c) an alkali metal carbonate regenerator, wherein the bicarbonate precipitate, which can be an aqueous slurry of alkali metal bicarbonate, is transferred to the alkali metal carbonate regenerator, and ammonium species regenerate alkali metal carbonate. In some embodiments of the invention, the aqueous solution of the amine/amino acid salt regenerator is a predominantly concentrated alkali metal carbonate. The ammonium species are recovered from thermal treatment of the mixture after releasing $CO_2$ gas. $SO_2$ removed from gas stream reacts with alkali carbonate to form alkali metal bisulfate and/or sulfate, which is removed from the system by precipitation at an appropriate location. The alkali metal bisulfate and/or sulfate can be further converted to ammonium bisulfate and/or sulfate, which is a commercially valuable product. The solubility of alkali metal sulfate is smaller than ammonium sulfate, so the alkali metal sulfate will precipitate out of the system. However, after obtaining alkali metal sulfate solid from the system, the solid can then be dissolved in water and reacted with excess amount of ammonium species to force the precipitation of ammonium sulfate. The alkali metal is potassium, lithium, sodium, or the like. The amine and/or amino acid aqueous solution can be an amine solvent, an amine or amino acid salts, or other organic alkali. The amine solvent can comprise an amine and/or an amino acid salt, which has the advantage of better absorption kinetics (compared with the carbonate salts) and lower volatility (compared with the ammonia aqueous solution). The amine solvent can be mainly chemically regenerated and not thermally regenerated, which reduces the evaporation, degradation, and corrosion of the amine and/or the amino acid salt. The mixture of alkali metal bicarbonate slurries and ammonium species has the advantages of smaller heat capacity, lower decomposition temperature, higher $CO_2$ releasing capacity and kinetics, and lower cost. In some embodiments of the invention, it is advantageous to reduce the amount of water in the thermal stripping process due to the large heat capacity and large latent heat of water. The system comprises a separation of the absorption and the precipitation. In the amine solvent, the primary chemical is an amine, and/or an amino acid salt, and/or other organic alkaline. No precipitation is formed in the absorber because of the water-solubility of amine carbamates. In the amine regenerator, precipitation forms when the amine solvent contacts with an alkali metal carbonate salt, and the amine solvent is chemically regenerated. In some embodiments of the invention, a substantial portion of the bicarbonate precipitation is separated in the amine regenerator.

The heat to facilitate the ammonium species, such as $NH_4HCO_3$, decomposition can be from any suitable source, such as waste heat, and can be transmitted through hot air and/or hot fluid, such as water. Waste heat can come from a boiler (tail end) or a flue gas. The thermal energy from flue gas without a FGD is captured by the amine solvent, and is then transferred to the upper part of the potassium carbonate regenerator (the temperature is about 50~100° C.) by a heat exchanger, as shown in FIG. 6. Therefore, low pressure steam consumption could be reduced because of the utilization of the waste heat from flue gas.

The $CO_2$ and/or $SO_2$ containing flue gas can be from any suitable source, such as fossil fuel power plants (coal, oil, or gas fired), steel, chemical, or cement plants.

The present invention provides for a novel solvent system for $CO_2$ capture comprising: an absorber, an amine regenerator and a carbonate regenerator. The absorber comprises an aqueous solution (or solvent) of an organic alkaline (such as an amines, amino acid (or salt thereof), piperazine (PZ) (or its derivatives thereof), or ionic liquid, or mixture thereof), inorganic alkaline (such as $K_2CO_3$, $Na_2CO_3$, or the like, or mixture thereof), or a mixture of the organic alkaline and inorganic alkaline. The absorber absorbs $CO_2$ and/or $SO_2$, after which the rich solvent is transferred to the amine regenerator. Herein the concentration of alkali metal carbonate salt must be controlled so that bicarbonate solid is not produced in the absorber during absorption process. Alkali metal bicarbonate and sulfate/sulfite precipitations form after the spent absorption solvent reacts with concentrated alkali metal carbonate solvent in an amine regenerator. The heat stable salts coming from the reaction between amine and $SO_2$ react with alkali metal carbonate to form alkali metal sulfite and/or sulfate precipitates due to their low solubility in water. In the amine regenerator, the amine solvent reacts with a concentrated alkali metal carbonate solvent. Liquid phase comprises chemically regenerated amine; solid phase is bicarbonate and/or sulfate/sulfite precipitation. In essence, both $CO_2$ and $SO_2$ are transformed from the liquid amine solvent to produce the corresponding alkali metal salt crystallization. The absorption solvent may further include an absorption rate promoter, an antioxidant, a corrosion inhibitor, a flocculation aid, or a mixture thereof. The alkali metal carbonate can be potassium carbonate. The carbonate regenerator can comprise a low pressure steam (such as from a reboiler) which strips the $CO_2$ gas and regenerates the solvent. The regenerated solvent can be recycled by returning to the absorber. In some embodiments, the system further comprises a heat exchanger which facilitates energy transfer from high temperature lean solvent to low temperature rich solvent. A slurry containing alkali metal bicarbonate solid and solvent is converted to a liquid solvent by using the waste heat from the reboiler, and sent into the alkali metal carbonate regenerator. In the upper part of the alkali metal carbonate regenerator, when alkali metal bicarbonate solvent is stripped by low pressure steam at a moderate temperature (e.g. 60~100° C.), with the existence of ammonium species catalysts (e.g. ammonium carbamate, ammonium carbonate, ammonium bicarbonate, and ammonium hydroxide, etc.), $CO_2$ is stripped out. Vaporized ammonia gas is captured by water (with the existence of $CO_2$ gas stream) or by alkali metal bicarbonate slurries to form aqueous ammonium species solution in a condenser, which flows back to the top of the potassium carbonate regenerator. In the lower part of the alkali metal carbonate regenerator, the temperature increases, and the concentration of ammonium species decreases due to the thermal instability of the ammonium species. alkali metal carbonate becomes dominant component in the solvent. Ammonium species are further removed under a high temperature of at least 100° C. in a reboiler. In some embodiments of the invention, concentrated alkali metal carbonate flowing out of potassium carbonate regenerator is expected to contain insignificant amount of ammonium species. After stripping process, as the temperature of the mixture solvent cools down, $M_2SO_4$ and $MHCO_3$ solid can be separately produced due to the solubility difference, with $M_2SO_4$ precipitates first, followed by $MHCO_3$. $M_2SO_3$ may be oxidized to form $M_2SO_4$, which is a fertilizer and sold for profit. M can be potassium, sodium, lithium, or ammonium.

A suitable amine is an amine that can effectively transfer the absorbed $CO_2$ to the alkali metal carbonate, i.e. the $CO_2$-rich amine can be converted to $CO_2$-lean amine by the alkali metal carbonate. Suitable amines include, but are not limited to a secondary amine, a tertiary amine, a sterically hindered amine, or an amino acid salt, or a mixture thereof. In particular, the amine is a one-N-substituted piperazine such as 1-(2-hydroxyethyl)piperazine, 1-(2-aminoethyl)piperazine, 1-(2-ethoxyethyl)piperazine, 1-(2-methoxyethyl)piperazine, 1-(1,3-dioxolan-2-ylmethyl)piperazine, 1-(1-methyl-4-piperidinyl)piperazine, 1-[2-(2-hydroxyethoxy)ethyl]piperazine, 1-[2-(dimethylamino)ethyl]piperazine, 1-[3-(dimethylamino)propyl]piperazine, 1-methylpiperazine, 1-ethylpiperazine, 1-butylpiperazine, 1-decylpiperazine, 1-(4-hydroxybutyl)piperazine, or a mixture thereof. Or the amine is a two-N-substituted piperazine such as 1,4-bis(2-hydroxyethyl)piperazine, 1,4-bis(3-aminopropyl)piperazine, 1-amino-4-(2-hydroxyethyl)piperazine, 1-methyl-4-(1-piperidin-4-ylethyl)piperazine, 1,4-bis(methyl)piperazine, 1,4-bis(ethyl)piperazine, 1,4-bis(butyl)piperazine, or a mixture thereof.

Suitable absorption rate promoters, include, but are not limited to, piperazine, 2-amino-2-methylpropanol (AMP), diglycolamine (DGA), monoethanolamine (MEA), enzyme carbonic anhydrase, piperazine-2-carboxylic acid salt, amino acid salts from the group comprising glycine, alanine, serine, glutamine, proline, lysine, arginine, histidine, or a mixture thereof.

The temperature of the absorption solution is in the range of 20° C.~100° C., or more preferably in the range of 40° C.~90° C. In the upper part of the potassium carbonate regenerator, the temperature of the regeneration solution is in the range of 40° C.~100° C., 60° C.~90° C., or 70° C.~90° C. The existence of the ammonium species catalysts leads to a reduction of stripping temperature. Herein the waste heat may be applied. In the lower part of the potassium carbonate regenerator, or in the reboiler, the temperature of the regeneration solution is in the range of 80° C.~270° C., 80° C.~200° C., or 100° C.~120° C., where the amount of the ammonium species is insignificant. The stripping pressure in the potassium carbonate regenerator is in the range of 100 kPa~7 MPa. The absorber can comprise more than one component. The absorbent can be a binary system or a ternary system or quaternary system.

In some embodiments the amine regenerator is placed right above the alkali metal carbonate regenerator. The alkali metal bicarbonate and/or alkali metal sulfate/sulfite rich solvent is transferred to the alkali metal carbonate regenerator by gravity. No slurry pump is adopted (FIGS. 5 and 6). In some embodiments, in the amine regenerator, the amine solvent and the alkali metal carbonate solvent is immiscible due to the salting out effect (FIG. 2).

In some embodiments, alkali metal carbonate solid forms from the alkali metal carbonate regenerator after stripping process, which is used for the amine solvent regeneration.

In some embodiments, when two immiscible liquid phases form in the amine regenerator, $SO_2$ and $CO_2$ are captured sequentially in two absorbers. Herein, the lower phase (concentrated alkali metal carbonate) is pumped into the $SO_2$ absorber to scrub $SO_2$, and the upper phase (amine solvent) is pumped into the $CO_2$ absorber to scrub $CO_2$, respectively (FIG. 10).

In some embodiments of the current invention mentioned above can also includes an absorption solvent comprising: an amine solvent and a potassium carbonate salt, wherein a reverse osmosis membrane reactor is adopted to concentrate the $CO_2$- and/or-$SO_2$-rich amine solvent. Part of water is separated from the amine solvent. The mixture of concentrated amine solvent and concentrated potassium carbonate solvent exhibits three phases: two liquid phases (upper liquid phase mainly comprises amine, and lower liquid phase mainly comprises carbonate salt), and a solid phase comprises potassium bicarbonate and/or potassium sulfate/sulfite. The upper phase is diluted by the water separated from the reverse osmosis membrane reactor, and pumped into the absorber for absorption. The diluted absorption solvent facilitates the improvement of absorption kinetics, the reduction of corrosive, and avoidance of amine evaporation.

In some embodiments of the invention, the system further comprises an absorption solvent comprising: an amine, an alkali metal carbonate salt, water, and a water-soluble polymer, such as polyethyleneglycol (PEG), which facilitates the salting out effect. The mixture of amine solvent containing PEG and alkali metal carbonate solvent exhibits three phases: two liquid phases (upper liquid phase comprises the amine and water-soluble polymer, and lower liquid phase mainly comprises carbonate salt), and a solid phase comprises alkali metal bicarbonate and/or alkali metal sulfate/sulfite. The upper phase is pumped into the absorber for $CO_2$ and/or $SO_2$ scrubbing.

The absorber employs an aqueous solution of amine with or without an absorption rate promoter to capture $CO_2$ from flue gas. The promoter is selected from amines or amino acids such that it can effectively release the absorbed $CO_2$ to $K_2CO_3$, resulting in the production of $KHCO_3$ precipitates. Subsequently, $KHCO_3$ is converted, by reacting with a regeneration rate promoter (such as $NH_2CO_2NH_4$), to $K_2CO_3$ and $NH_4HCO_3$. Herein the regeneration rate promoter is an ammonium species catalyst. The catalyst is exemplified as $NH_2CO_2NH_4$, but equally well with ammonium carbonate, ammonium bicarbonate, ammonium hydroxide, or a mixture thereof. $K_2CO_3$ is reused in the absorber, and $NH_4HCO_3$ decomposed to release $CO_2$ gas and regenerate $NH_2CO_2NH_4$. $NH_2CO_2NH_4$ is recycled for the conversion of $KHCO_3$ to $K_2CO_3$. Preliminary estimates indicate that the energy demand of solvent regeneration is about 60% that of 30 wt % MEA. However, $NH_4HCO_3$ decomposes at low temperature (60° C.); consequently, waste heat from power plants may be employed. As a result, the actual energy demand could be as small as only 25% that of 30 wt % MEA.

The new solvent system includes a chemical transformation step in addition to the two steps, i.e. $CO_2$ absorption and solvent regeneration, involved in a conventional solvent system. The new system poses no $NH_3$ emission problem from the absorber because there is insignificant amount of ammonia-containing species in the absorber. The system can substantially reduce the energy demand for solvent regeneration because it deals with aqueous slurries of $KHCO_3$ and $NH_4HCO_3$, and thus largely reduce the sensible and latent heat consumed by water in the stripping process of a conventional solvent system. Also, $CO_2$ is produced from the thermal decomposition of $NH_4HCO_3$, which occurs more readily than the thermal decomposition of $KHCO_3$ or amine carbamate, thus further decreases the sensible heat consumption. Moreover, the reagent loss and equipment corrosion are expected to be substantially less than amine-based systems because the high temperature solvent regeneration step does not involve organic additives.

Various embodiments of the system are shown in FIGS. 2, 5, 6, 9, and 10.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION

Figure 1:
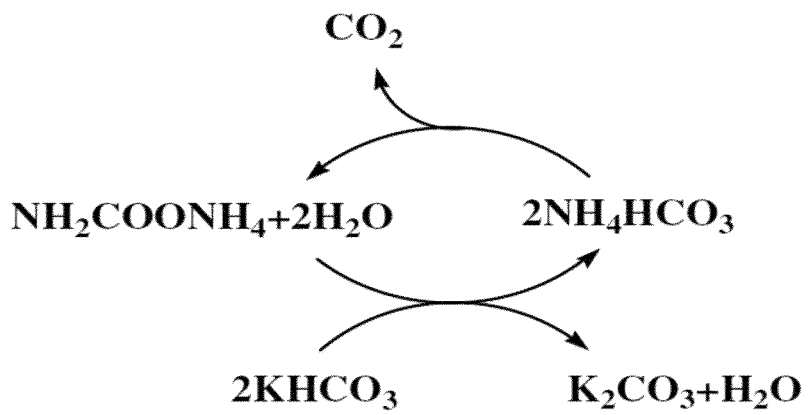
FIG. 1 shows (A) a method for the regeneration of $K_2CO_3$, and (B) a mechanism of chemical transfer regeneration process.
Figure 1:
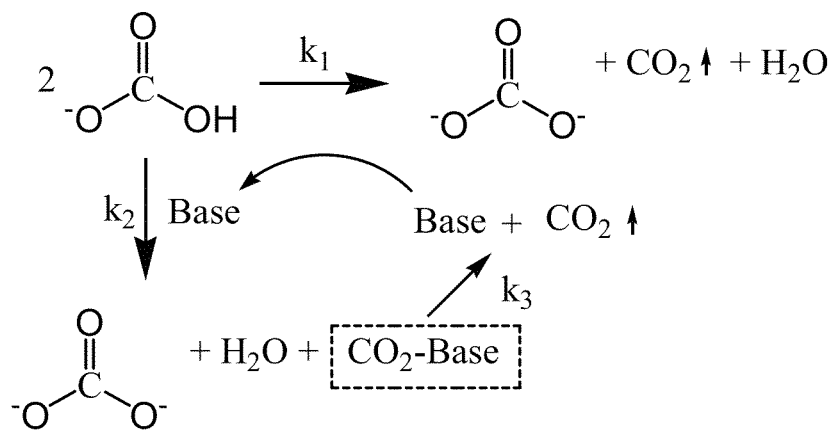
Figure 2:
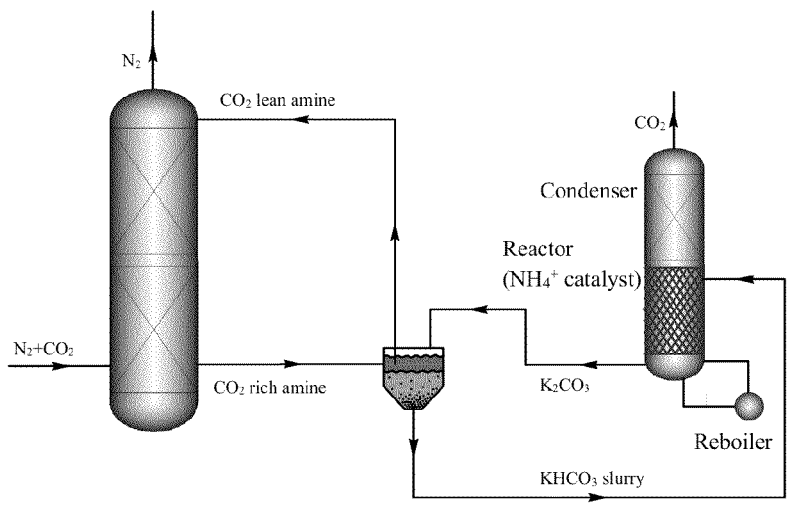
FIG. 2 shows a conceptual process configuration of a solvent system for the removal of $CO_2$ from flue gas, using potassium carbonate to regenerate amine in amine regenerator and ammonium species to promote the decomposition of $KHCO_3$.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed within the invention. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "and", and "the" include plural referents unless the context clearly dictates otherwise. Thus, for example, reference to "an absorber" includes a plurality of such absorbers, and so forth.

These and other objects, advantages, and features of the invention will become apparent to those persons skilled in the art upon reading the details of the invention as more fully described below.

In the description herein, where certain chemicals are presented in the potassium form, such as $KHCO_3$ and $K_2CO_3$, the chemical as applied to the present invention can be in any alkali metal form. For example, where $KHCO_3$ and $K_2CO_3$ are used, the invention can use $MHCO_3$ and $M_2CO_3$ used, wherein M is an alkali metal. Particularly suitable alkali metals are Na or K.

This invention is based on an unexpected result obtained by the inventors. In these experiments, we mixed an aqueous solution of potassium bicarbonate ($KHCO_3$) with ammonium carbamate ($NH_2CO_2NH_4$) or ammonium carbonate (($NH_4)_2CO_3$), and were surprised to find an increase of the solution pH, compared to the pH of both reactants before mixing. This implies that a strong base can be obtained by mixing two weak bases. We confirmed the results by detecting, using laser Raman spectroscopy, the increase of $CO_3^{2-}$ ion concentration, which indicates that potassium carbonate ($K_2CO_3$) can be produced by the reaction of $KHCO_3$ with $NH_2CO_2NH_4$ or $(NH_4)_2CO_3$. Based on this surprise discovery, we develop a novel solvent system that is comprised of three major components: $CO_2$ absorption, solvent transformation, and solvent regeneration. The absorber employs an aqueous solution of a mixture of inorganic alkaline ($K_2CO_3$ and/or $Na_2CO_3$) and a promoter selected from amines and/or amino acid salts. In addition to the enhancement of $CO_2$ absorption kinetics, the promoter must possess a favorable thermodynamic property that is capable of transferring a sufficient amount of the absorbed $CO_2$ to $K_2CO_3$, and results in the formation of $KHCO_3$. $KHCO_3$ forms solid and precipitates when the concentration reaches beyond the solubility limit. This can occur either in the absorber from a sufficient $CO_2$ absorption or in the holding tank/settling tank by cooling the solution to decrease the solubility of $KHCO_3$. Subsequently, $KHCO_3$ aqueous slurry is transferred to a transformer/regenerator for reaction with a decomposition promoter, such as $NH_2CO_2NH_4$. In this transformer/regenerator, $CO_2$ is transferred from $KHCO_3$ to $NH_2CO_2NH_4$ to produce $NH_4HCO_3$ slurry and $K_2CO_3$ and/or $NH_2CO_2K$. $NH_4HCO_3$ may decompose to produce $CO_2$ and $NH_3$ gas in this reactor, and one half of this $CO_2$ and the released $NH_3$ can recombine to form $NH_2CO_2NH_4$ in a condenser (Rx 1). The remaining half of $CO_2$ gas is pressurized to supercritical liquid for sequestration.

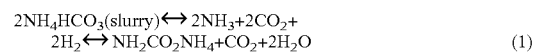
$$2NH_4HCO_3(slurry) \leftrightarrow 2NH_3 + 2CO_2 + 2H_2 \leftrightarrow NH_2CO_2NH_4 + CO_2 + 2H_2O \quad (1)$$

The decomposition of $NH_4HCO_3$ can occur at mild temperatures (~60° C.); consequently, hot water from power plant waste heat may be employed. However, if the conversion of $KHCO_3$ were not fast enough to produce a solvent with a sufficient concentration of $K_2CO_3$ at this temperature, a second solvent regenerator may be used to treat the remaining solution from the first regenerator at a temperature and pressure higher than those used in the first regenerator. Low pressure steam from a reboiler may be employed in this second regenerator.

Mechanism of Chemical Transfer Regeneration Process

The present invention provides for a novel solvent system that integrates amine, potassium carbonate, and ammonium solvents to significantly reduce the parasitic energy demand of $CO_2$ capture from flue gas.

The solvent system comprises an absorber that employs an aqueous solution of amine solvent predominantly comprising of an amine and/or amino acid aqueous solution to capture $CO_2$ from flue gas. The $CO_2$-rich amine solvent is transferred to an amine regenerator, where an aqueous solution comprising predominantly concentrated alkali carbonate regenerates amine/amino acid salts while producing alkali bicarbonate precipitate. Subsequently, aqueous slurry of alkali bicarbonate is transferred to an alkali carbonate regenerator, where ammonium species regenerate alkali carbonate. The ammonium species are recovered from thermal treatment of the mixture after releasing $CO_2$ gas. $SO_2$ removed from gas stream reacts with alkali carbonate to form alkali bisulfate and/or sulfate, which is removed from the system by precipitation at an appropriate location. Herein alkali is exemplified as potassium, but equally well with lithium and sodium. The chemical transfer processes in the present invention are described in equations described herein.

Absorber:

$$CO_2 + x.\text{Amine} \rightarrow x.\text{Amine-COO} \quad (2\text{-}1)$$

Amine Regenerator:

$$x.\text{Amine-COO} + K_2CO_3 + H_2O \rightarrow x.\text{Amine} + 2KHCO_3 \quad (2\text{-}2)$$

Potassium Carbonate Regenerator:

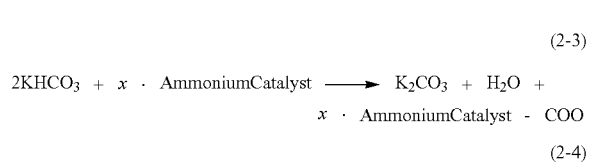

The solvent system comprises a chemical transformation step in addition to the two steps, i.e. $CO_2$ absorption and solvent regeneration, involved in a conventional solvent system. The new system poses no $NH_3$ emission problem from the absorber because there is insignificant amount of ammonia-containing species in the absorber. The system can substantially reduce the energy demand for solvent regeneration because it deals with aqueous slurries of $KHCO_3$ and $NH_4HCO_3$, and thus largely reduce the sensible and latent heat consumed by water in the stripping process of a conventional solvent system. Also, $CO_2$ is produced from the thermal decomposition of $NH_4HCO_3$, which occurs more readily than the thermal decomposition of $KHCO_3$ or amine carbamate, thus further decreases the sensible heat consumption. Moreover, the reagent loss and equipment corrosion are expected to be substantially less than the conventional solvent system because the high temperature solvent regeneration step does not involve any organic additives.

Figure 16:
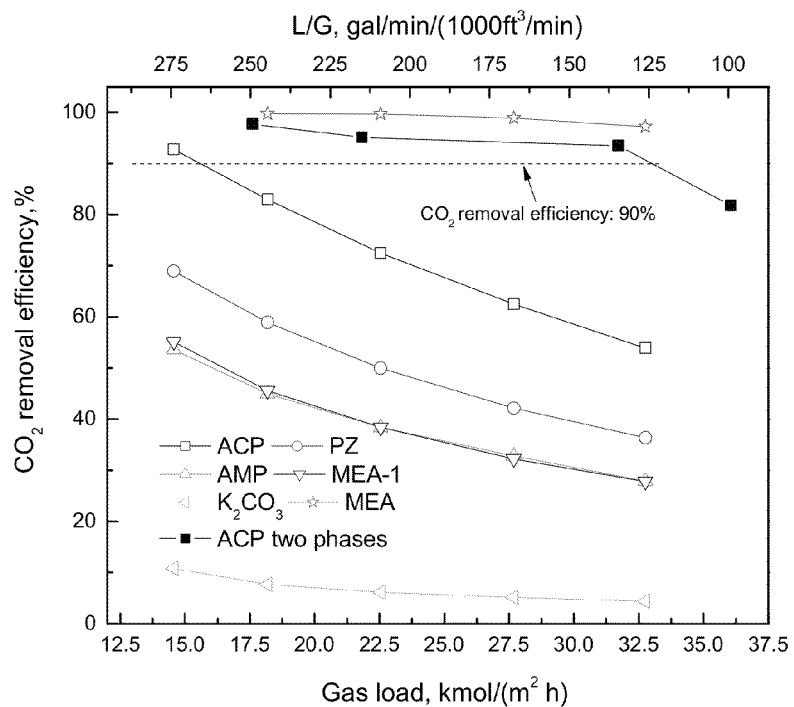
FIG. 16 shows a comparison of $CO_2$ removal efficiency of various solvents at a liquid load $L_w=12$ $m^3/(m^2 \cdot h)$ in a structure packed tower (one-inch-diameter and five-foot-tall). Herein, "MEA" denotes thermal regenerated monoethanolamine aqueous solution; "MEA-1" denotes chemical regenerated monoethanolamine solution using potassium carbonate solution; "ACP" denotes 1-(2-hydroxyethyl)piperazine solution regenerated by potassium carbonate solution; "PZ" denotes piperazine solution regenerated by potassium carbonate solution; "AMP" denotes 2-amino-2-methyl-1-propanol solution regenerated by potassium carbonate solution; "$K_2CO_3$" denotes the solvent containing only potassium carbonate; "ACP two phases" denotes 1-(2-hydroxyethyl)piperazine solution regenerated by potassium carbonate solution to form aqueous two phases, as mentioned above.

The amine solvent comprises an amine, which may transfer captured $CO_2$ to potassium carbonate solvent through a chemical reaction. This amine, more specifically but not limited, is N-substituted piperazine derivative. Moreover, an absorption rate promoter may be added for a better absorption performance. The amine solution may simply comprise an amine and a potassium carbonate, and no phase separation is observed during amine regeneration process by reacting with potassium carbonate. However, the absorption kinetics of such a one-phase solvent is insufficient. When the amine solution and the potassium carbonate solution are immiscible, and only amine solution (upper phase) is pumped into the absorber to scrub $CO_2$ and/or $SO_2$ (absorption temperature is 70° C.), the absorption kinetics of the absorbent is close to the kinetics of traditional 30 wt % ethanolamine solution (absorption temperature is 40° C.). Higher absorption temperature leads to a lower kinetics and a lower $CO_2$ capacity of the absorption process. Herein the absorption performance of the amine solvent in the present invention at 70° C. is close to the performance of 30 wt % MEA at 40° C., indicating the sufficient absorption performance of the amine solvent in the present invention. It can be seen from FIG. 16 that the absorbents without phase separation process exhibit much lower absorption kinetics (absorption temperature is 40° C.) than the 30 wt % MEA solution. The reason for the absorption performance improvement in the two-phase solvent system is that, in the upper phase, most potassium carbonate salt is excluded by salting out effect, leading to a high amine concentration, which enhances the absorption kinetics, and low ionic strength of the solvent, which enhances the $CO_2$ solubility.

The thermal instability of various ammonium salts comprising $NH_3$ and $CO_2$ (such as ammonium carbonate, ammonium bicarbonate, or ammonium carbamate) is considered in the stripping process. Lower decomposition temperature and higher decomposition kinetics of potassium bicarbonate slurry stripping process may be achieved due to the existence of the ammonium species catalyst. The ammonium species catalyst reacts with potassium bicarbonate to form $CO_2$-contained ammonium species and potassium carbonate. At a moderate temperature (e.g. 60~80° C.), the $CO_2$-contained ammonium species catalyst decomposes. Ammonium species catalyst regenerates through releasing captured $CO_2$.

Figure 4:
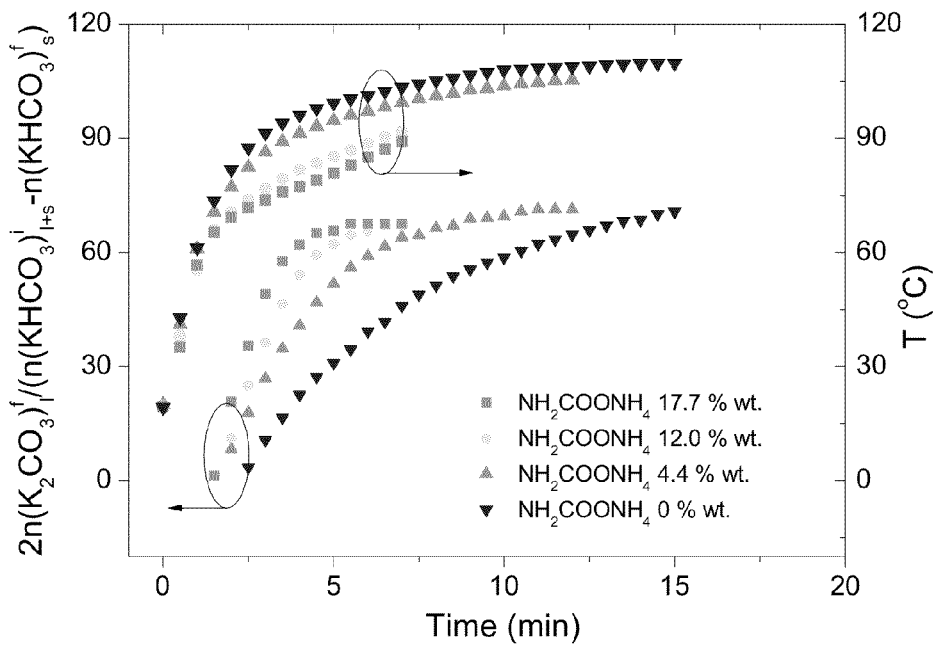
FIG. 4 shows the effect of different amount of ammonium carbamate in potassium bicarbonate slurry on the regeneration of potassium carbonate and slurry temperature as a function of time. The experiments are performed in a bench reactor.
Figure 5:
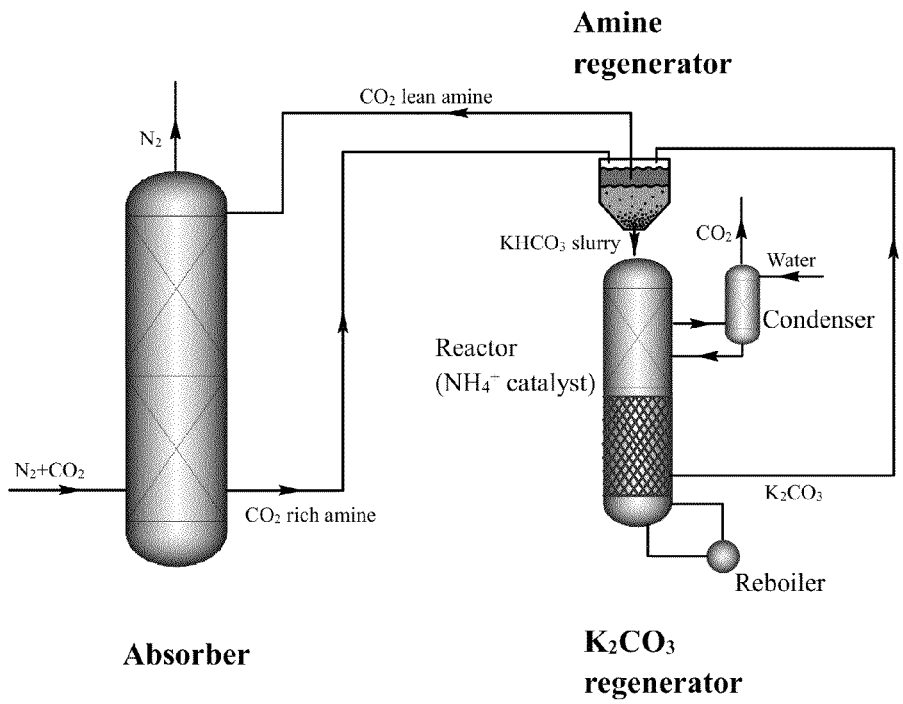
FIG. 5 shows a conceptual process configuration of a solvent system for the removal of $CO_2$ from flue gas, using ammonium species to promote the decomposition of $KHCO_3$. The amine regenerator is placed right above the potassium carbonate regenerator. Slurry is transferred by gravity, so the slurry pump may not be required.

In a bench-scale stripping experiment, higher stripping kinetics were observed when various amount of ammonium carbamate was added in the potassium bicarbonate slurries, indicating the stripping rate promotion effect of the ammonium species during the potassium bicarbonate stripping process (FIG. 4). Better kinetics lead to a smaller stripper structure, which will reduce the capital cost.

The stripping energy was calculated based on a bench-scale experiment and the data of the 30 wt % MEA stripping process. Because of the small amount of water, the small heat capacity of the slurry, and the non-volatility of the potassium carbonate, the stripping energy requirement of the present invention is almost a half of the stripping energy of the 30 wt % MEA process. If the waste heat is utilized, the stripping energy of the present invention further reduces.

Figure 6:
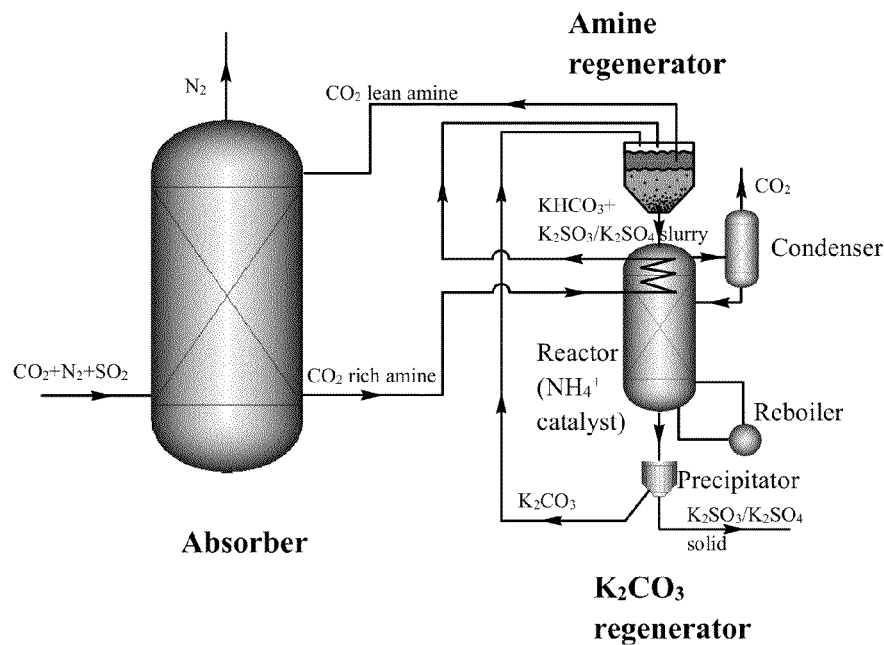
FIG. 6 shows a conceptual process configuration of a solvent system for simultaneous removal of $CO_2$ and $SO_2$ from flue gas in one absorber, using ammonium species to promote the decomposition of $KHCO_3$.
Figure 9:
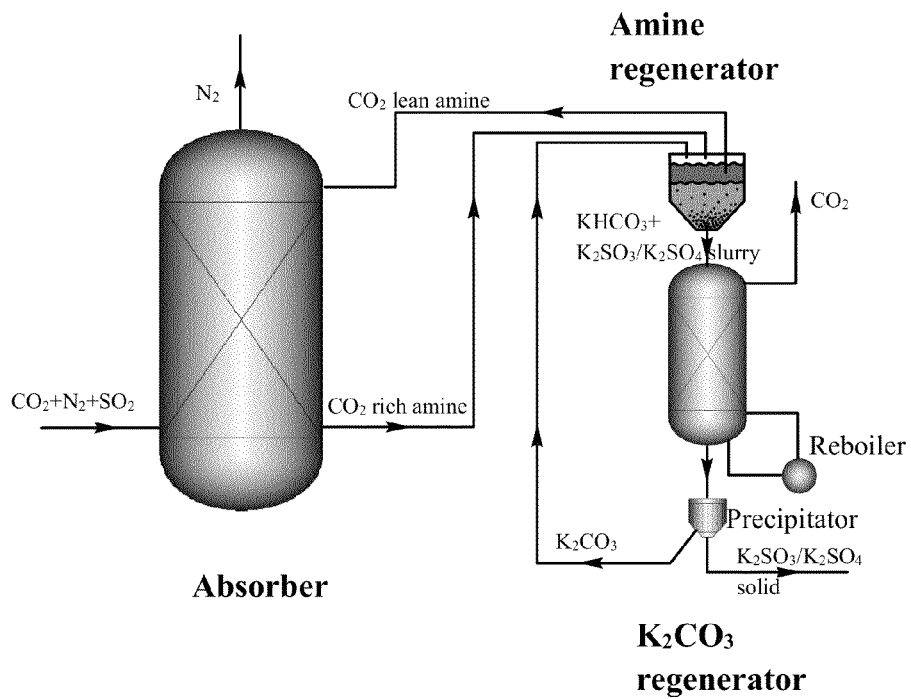
FIG. 9 shows a conceptual process configuration of a solvent system for simultaneous removal of $CO_2$ and $SO_2$ from flue gas in one absorber, wherein no ammonium catalyst is used. Potassium bicarbonate and potassium sulfate/sulfite slurry is stripped directly.

If $CO_2$ and $SO_2$ are scrubbed in one absorber (FIG. 6 and FIG. 9), $CO_2$ and $SO_2$ both react with the amine solvent. After contacting with potassium carbonate rich solution, amine solution is regenerated. In this case, $SO_2$ undergoes chemical reactions as described below.

$$x \cdot \text{Amine (aq)} + H_2O(l) + SO_2(g) \xrightarrow{O_2} x \cdot \text{Amine2H}^+ \text{(aq)} + SO_3^{2-}/SO_4^{2-} \text{(aq)} \quad (3\text{-}1)$$

$$SO_3^{2-}/SO_4^{2-} \text{(aq)} + 2K^+ \text{(aq)} = K_2SO_3/SO_4(s) \quad (3\text{-}2)$$

$$H_2O(l) + CO_3^{2-} \text{(aq)} = OH^- \text{(aq)} + HCO_3^- \text{(aq)} \quad (3\text{-}3)$$

$$x \cdot \text{Amine2H}^+ \text{(aq)} + 2OH^- \text{(aq)} \longrightarrow x \cdot \text{Amine(aq)} + 2H_2O(l) \quad (3\text{-}4)$$

Figure 10:
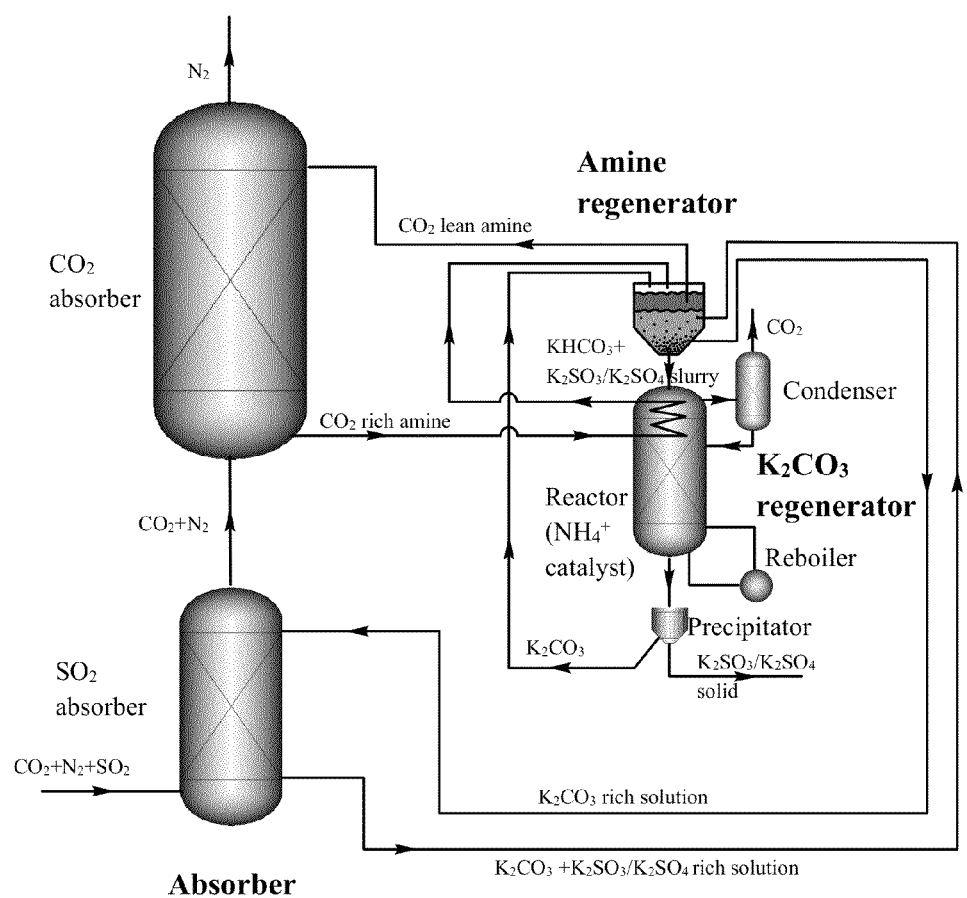
FIG. 10 shows a conceptual process configuration of a solvent system for sequential removal of $SO_2$ and $CO_2$ from flue gas in two absorbers, using ammonium species to promote the decomposition of $KHCO_3$.

If $CO_2$ and $SO_2$ are absorbed in two different absorbers separately (FIG. 10), and if there are two liquid phases in the amine regenerator, $SO_2$ reacts with potassium carbonate solvent which comes from the lower phase in the amine regenerator, and $CO_2$ reacts with the amine solution which comes from the upper phase in the amine regenerator. In this case, $SO_2$ undergoes chemical reactions as described below.

$$2K^+ \text{(aq)} + CO_3^{2-} \text{(aq)} + SO_2(g) \xrightarrow{O_2} K_2SO_3/SO_4(s+aq) + CO_2(g) \quad (4)$$

The potassium sulfate/sulfite precipitates due to its limited solubility. The slurry containing potassium sulfate/sulfite and potassium bicarbonate is transferred into the potassium carbonate regenerator. After stripping process, as the temperature of the mixture cools down, potassium sulfate/sulfite and potassium bicarbonate solid can be produced separately doe to the solubility difference; potassium sulfate/sulfite precipitates first, followed by potassium bicarbonate. Potassium sulfate/sulfite is a fertilizer and sold for profit. Potassium sulfate/sulfite can be converted to ammonium sulfate/sulfite, which has a larger commercial market. The solubility of potassium sulfate is smaller than ammonium sulfate, so the potassium sulfate will precipitate out of the system. However, after obtaining potassium sulfate solid from the system, the solid can then be dissolved in water and reacted with excess amount of ammonium species to force the precipitation of ammonium sulfate.

In the regeneration process of the novel carbon dioxide capture method, in which potassium carbonate absorbs $CO_2$ from flue gas to form potassium bicarbonate precipitation with the help of a promoter, potassium bicarbonate solid is converted to potassium carbonate rich solution by chemical transfer method, leading to a higher desorption rate. The mechanism of this chemical transfer regeneration process is illustrated in FIG. 1.

The reaction enthalpy is:

$$2KHCO_3(s) \rightarrow K_2CO_3(s) + H_2O(g) + CO_2(g) \quad \Delta H = 3180 \text{ kJ/kg } CO_2$$

$$2KHCO_3(s) \rightarrow K_2CO_3(aq) + H_2O(l) + CO_2(g) \quad \Delta H = 1479 \text{ kJ/kg } CO_2 \quad (5)$$

Assuming that $k_2$ is fast enough not to be a rate control step, if $k_3$ is larger than $k_1$, the carbon dioxide release process will be accelerated, and active energy will be reduced, as shown in FIG. 1.

The promoter would be some kinds of weak based with small plc, such as ammonium carbamate, amines, or physical solvents.

After the regeneration process, if potassium carbonate rich solution is obtained instead of potassium carbonate solid, the energy required for precipitating potassium carbonate (701 kJ/kg $CO_2$) will be saved, as shown in Equations 6 and 7. Therefore, in our regeneration process, potassium carbonate rich solution was formed after stripping.

$$2KHCO_3(s) \rightarrow K_2CO_3(s) + H_2O(g) + CO_2(g) \quad (6)$$

$$\Delta_r H^\ominus = 2180 \text{ kJ/kg } CO_2$$

$$2KHCO_3(s) \rightarrow K_2CO_3(aq) + H_2O(l) + CO_2(g) \quad (7)$$

$$\Delta_r H^\ominus = 1479 \text{ kJ/kg } CO_2.$$

Types of Promoters

The single most expensive operating cost of MEA system for $CO_2$ capture is the energy demand, which has been estimated to be about 25%-35% of power plant output. The major component is in steam for stripping $CO_2$ to regenerate solvent.

To reduce the energy demand, the invention employs a novel solvent transformation approach. $CO_2$ in flue gas is absorbed by an amine which serves as a rate promoter in aqueous $K_2CO_3$ solution. This promoter, in addition to promote $CO_2$ absorption, must be able to effectively transfer the absorbed $CO_2$ to $K_2CO_3$ to produce $KHCO_3$. $KHCO_3$ precipitates when reaches the solubility limit. Subsequently, $KHCO_3$ aqueous slurry is transferred to the regenerator where it reacts with a decomposition rate promoter. The decomposition promoter must be able to extract the $CO_2$ in $KHCO_3$ and form a product that can be decomposed readily at a low temperature. Thus, $CO_2$ gas can be produced and promoter regenerated with little energy demand.

The system can comprises a $CO_2$ absorption rate promoter, and/or $KHCO_3$ decomposition rate promoter.

Using Ammonia to Capture $CO_2$

In some embodiments of the invention, ammonia ($NH_3$) is used in the capture of $CO_2$ to form $HCO_3^-$, $CO_3^{2-}$, and $NH_4^+$ ions along with solid precipitates containing $NH_4HCO_3$ and $(NH_4)_2CO_3$ (Eq. 8-1 to 8-5). Regeneration involves heating the aforementioned chemical mixtures to recover ammonium solution for recycle. In the meantime, a concentrated $CO_2$ and some $NH_3$ gases are released. The release of $NH_3$ and $CO_2$ arises from their smaller solubility or Henry's constant (Eq. 8-1 to 8-3) as well as from the decomposition of $NH_4HCO_3$ and $(NH_4)_2CO_3$ precipitates (Eq. 8-6 and 8-7) at elevated temperatures.

The emission rate of $NH_3$ from aqueous solutions depends on the pH, temperature, and the concentration (ionic strength) of $NH_4^+$ in the liquid phase. The solution with large $OH^-$ (high pH) and $NH_4^+$ concentrations, the larger is the emission rate of $NH_3$ (Eq. 8-6). However the larger the $OH^-$ concentration in the solution, the more effective is the absorption efficiency of $CO_2$ (Eq. 8-4 and 8-5).

Chemical reactions involved in aqueous ammonium process can be summarized as follow:

$$CO_2(g) + 2H_2O \leftrightarrow H_3O^+ + HCO_3^- \quad (8\text{-}1)$$

$$HCO_3^- + OH^- \leftrightarrow CO_3^{2-} + H_2O \quad (8\text{-}2)$$

$$NH_3 + H_2O \leftrightarrow NH_4^+ + OH^- \quad (8\text{-}3)$$

$$NH_4^+ + HCO_3^- \leftrightarrow NH_4HCO_3(s)\downarrow \quad (8\text{-}4)$$

$$2NH_4^+ + CO_3^{2-} \leftrightarrow (NH_4)_2CO_3(s)\downarrow \quad (8\text{-}5)$$

$$NH_4HCO_3(s) \rightarrow CO_2\uparrow + NH_3\uparrow + H_2O \quad (8\text{-}6)$$

$$(NH_4)_2CO_3(s) \rightarrow CO_2\uparrow + 2NH_3\uparrow + H_2O \quad (8\text{-}7)$$

When $NH_4^+$, $HCO_3^-$, $CO_3^{2-}$ concentrations reach the solubility products ($K_{sp}$) of $NH_4HCO_3$ (ammonium bicarbonate) and $(NH_4)_2CO_3$ (ammonium carbonate) salts, solid precipitates occur according to Eq. 8-7 and 8-8.

Based on the common ion effect (LeChatelier's principle), one can increase the $CO_2$ absorption, and thus the $HCO_3^-$ and $CO_3^{2-}$ concentrations (Eq. 8-8 and 8-9), by the addition of a nonvolatile alkaline, such as potassium or magnesium hydroxide, in aqueous ammonium solutions. Consequently, the amount of $NH_4OH$ employed can be reduced, while still producing a sufficient amount of ammonium bicarbonate and carbonate precipitates.

$$CO_2 + KOH \leftrightarrow K^+ + HCO_3^- \quad (8\text{-}8)$$

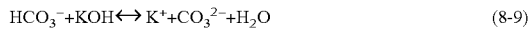

$$HCO_3^- + KOH \leftrightarrow K^+ + CO_3^{2-} + H_2O \quad (8\text{-}9)$$

Upon heat treatment, the decomposed ammonium bicarbonate and carbonate can be refurbished continuously from the excess amount of bicarbonate and carbonate ions in the solutions.

Figure 18:
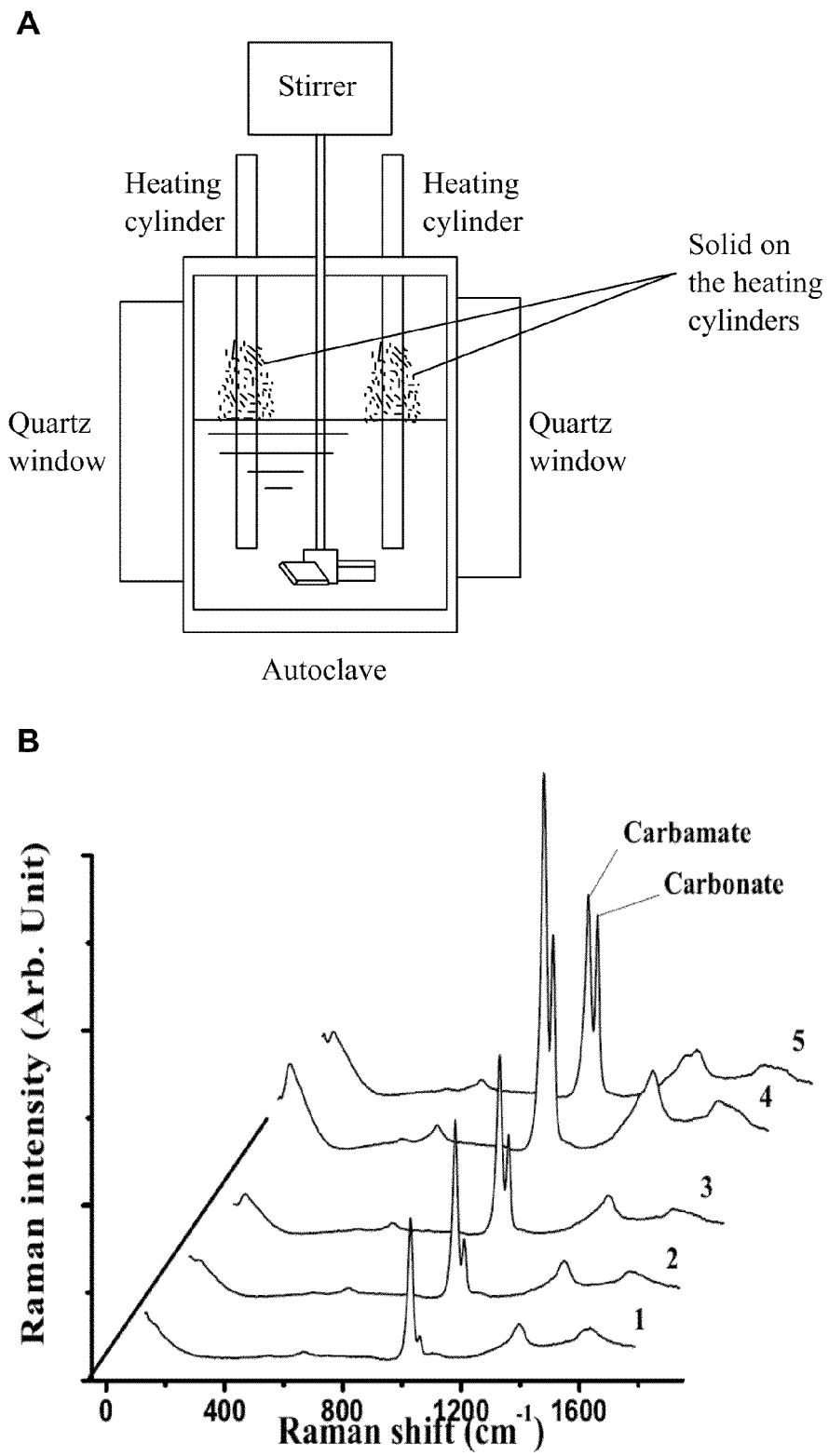
FIG. 18 shows (A) a experimental setup for measuring the carbamate and carbonate production from the competitive reactions between bicarbonate and ammonia, and (B) a laser Raman spectroscopy result.

The competitive reactions between a bicarbonate, such as potassium bicarbonate, and ammonia (see Eq. 8-10) can be measured using the setup shown in FIG. 18A. The results of one of experiment shows the relative amounts of carbonate and carbamate produced (FIG. 18B).

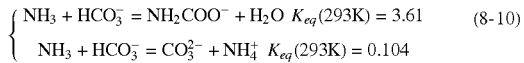

$$\begin{cases} NH_3 + HCO_3^- = NH_2COO^- + H_2O & K_{eq}(293K) = 3.61 \\ NH_3 + HCO_3^- = CO_3^{2-} + NH_4^+ & K_{eq}(293K) = 0.104 \end{cases} \quad (8\text{-}10)$$

The potassium carbonate regenerator can be operated at ambient pressure (100 kPa) or at elevated pressure (less than 7 MPa). High pressure process helps in capturing ammonium species catalysts, improving concentration of potassium carbonate in outlet liquid stream, and reducing cost of the $CO_2$ pressurized process. In some embodiments, potassium carbonate solid is produced by the potassium carbonate regenerator, which facilitates the removal of ammonium species, and the regeneration of amine solution.

Figure 17:
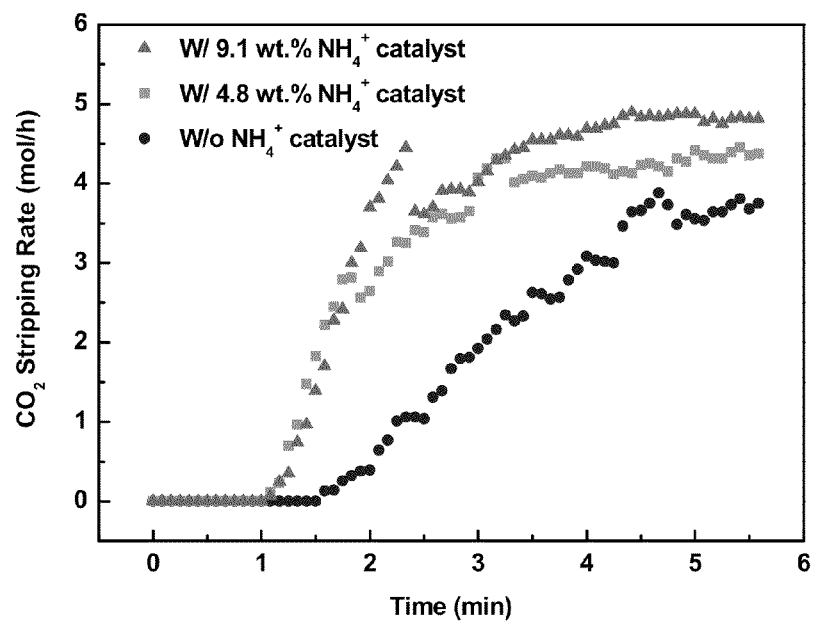
FIG. 17 shows the time dependent $CO_2$ stripping rate of 50 wt % potassium bicarbonate slurry containing various amounts (0 to 9.1%) of ammonium carbamate catalyst determined by using a continuous flow stripping apparatus.

The $CO_2$ stripping rate vs. time characteristics performed by a scale-up stripping system is shown in FIG. 17. Low pressure steam is generated by a steam boiler to provide stripping energy. After stripping for 4.5 min, the $CO_2$ stripping rates are in the steady state. It is obvious that ammonium catalyst facilitates the stripping rate improvement.

Various Configurations of the System
Ammonia and Potassium Carbonate Precipitation Process
Reaction in an Ammonium Bicarbonate Precipitator:

$$2KHCO_3 + 2NH_2COONH_4 \rightarrow 2NH_4HCO_3\downarrow + 2NH_2COOK \quad (9)$$

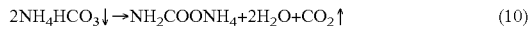

$$2NH_4HCO_3\downarrow \rightarrow NH_2COONH_4 + 2H_2O + CO_2\uparrow \quad (10)$$

Reaction in a Potassium Carbonate Precipitator:

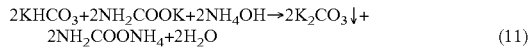

$$2KHCO_3 + 2NH_2COOK + 2NH_4OH \rightarrow 2K_2CO_3\downarrow + 2NH_2COONH_4 + 2H_2O \quad (11)$$

Reaction in a Stripper:

$$NH_2COONH_4 + 2H_2O \rightarrow CO_2\uparrow + 2NH_4OH \quad (12)$$

Other Non- or Less Volatile Promoters

The activators include solid adsorbent (such as amine modified porous zeolites), functional ionic liquid (such as amine modified imidazolium ionic liquid), organic amines (such as methyl diethanolamine, MDEA, or amino acids), physical solvents (such as 2-ethyl-1-hexanol), or other materials which facilitate the release of $CO_2$ from $KHCO_3$ slurry. The activators are insoluble in potassium carbonate rich solution, and they can be easily separated by a phase separator. No more heat is required for this separation. The temperature of the phase separator and the stripper is very close. That is to say, the activators remain high temperature at all time. Little sensible heat for the activator is needed. Because of the non- or less volatility of the activators, little latent heat of the activators is required.

Transfer $CO_2$ from $KHCO_3$ to Polyamine Aqueous Solution for Stripping

Aqueous solutions of a highly concentrated polyamine, such as polyethylenimine (PEI), is used as a stripping solvent. The amount of water in polyamine aqueous solution is as small as possible. Potassium bicarbonate slurry reacts with polyamine aqueous solution to form potassium carbonate solution and polyamine carbamate solution. Because of the intermolecular force between polymer and salt, the potassium carbonate and polyamine carbamate would form aqueous two phase system (ATPS). The upper phase is polyamine carbamate aqueous solution, and the down phase is potassium carbonate aqueous solution. The polyamine carbamate aqueous solution is sent to a stripper for stripping $CO_2$ and regenerating polyamine. The potassium carbonate aqueous solution with a rate promoter is used for $CO_2$ absorption.

The following are particular embodiments of the invention:

A method for capturing $CO_2$ and/or $SO_2$ from a gas stream in an absorber, wherein the flue gas is passed through an aqueous solution containing: an absorbent comprising of at least an amine and/or amino acid salts, wherein the $CO_2$ and/or $SO_2$ is absorbed; the $CO_2$ and/or $SO_2$-rich solution is transported to an amine regenerator, wherein an aqueous alkali carbonate extracts $CO_2$ and/or $SO_2$ from the $CO_2$ and/or $SO_2$-rich solution forming an aqueous alkali bicarbonate and alkali sulfate/sulfite slurry and regenerating the absorbent, i.e. $CO_2$ and/or $SO_2$-lean absorbent solution; the said aqueous alkali bicarbonate and alkali sulfate/sulfite slurry is transported to an alkali carbonate regenerator, wherein ammonium species catalyzes the decomposition of alkali bicarbonate resulting in the regeneration of alkali carbonate and production of concentrated $CO_2$ gas; the said sulfate/sulfite slurry is precipitated out of the carbonate solution.

In some embodiments of the invention, the amine is at least one of those amines that can effectively transfer the absorbed $CO_2$ to alkali carbonate, i.e. the $CO_2$-rich amine can be converted to $CO_2$-lean amine by alkali carbonate solution. In some embodiments of the invention, the amine is 1-(2-hydroxyethyl)piperazine, 1-(2-aminoethyl)piperazine, 1-(2-ethoxyethyl)piperazine, 1-(2-methoxyethyl)piperazine, 1-(1,3-dioxolan-2-ylmethyl)piperazine, 1-(1-methyl-4-piperidinyl)piperazine, 1-[2-(2-hydroxyethoxy)ethyl]piperazine, 1-[2-(dimethylamino)ethyl]piperazine, 1-[3-(dimethylamino)propyl]piperazine, 1-methylpiperazine, 1-ethylpiperazine, 1-butylpiperazine, 1-decylpiperazine, 1-(4-hydroxybutyl)piperazine, 1,4-bis(2-hydroxyethyl)piperazine, 1,4-bis(3-aminopropyl)piperazine, 1-amino-4-(2-hydroxyethyl)piperazine, 1-methyl-4-(1-piperidin-4-ylethyl)piperazine, 1,4-bis(methyl)piperazine, 1,4-bis(ethyl)piperazine, 1,4-bis(butyl)piperazine, or a mixture thereof. In some embodiments of the invention, the absorption solvent further comprises an absorption rate promoter. In some embodiments of the invention, the rate promoter is piperazine, 2-amino-2-methylpropanol (AMP), diglycolamine (DGA), ethanolamine (MEA), enzyme carbonic anhydrase, piperazine-2-carboxylic acid salt, amino acid salts from the group comprising glycine, alanine, serine, glutamine, proline, lysine, arginine, and histidine, or a mixture thereof.

In some embodiments of the invention, the $CO_2$ containing flue gas is from a fossil fuel power plant, steel plant, chemical plant, or cement plant. In some embodiments of the invention, the absorption solvent further comprises an antioxidant, a corrosion inhibitor, a flocculation aid, or a mixture thereof. In some embodiments of the invention, the absorber is a random packing tower, a structure packing tower, a tray tower, or a spray tower. In some embodiments of the invention, the gas stream is scrubbed by the aqueous absorbent at a temperature of about 20° C.~100° C. In some embodiments of the invention, the aqueous absorbent comprises an amine with a concentration of about 2.5 mol/L~8 mol/L, and an alkali carbonate with a concentration of about 0.01 mol/L~2.5 mol/L. In some embodiments of the invention, the aqueous potassium bicarbonate and potassium sulfate/sulfite slurry comprises potassium bicarbonate with a concentration of at least about 5 mol/kg water, potassium sulfate/sulfite with a concentration of at most about 2 mol/kg water, and water. In some embodiments of the invention, the aqueous absorbent comprises an amine with a concentration of about 0.0 µmol/L~2.5 mol/L, and an alkali carbonate with a concentration of about 0.01 mol/L~2.5 mol/L. After absorption process, the aqueous absorbent is treated by a reverse osmosis membrane reactor to be concentrated (to the concentration of about 2.5 mol/L~8 mol/L amine). The concentrated absorbent contacts with alkali carbonate aqueous solution to be regenerated. Then the upper phase in the amine regenerator is pumped out and diluted with water coming from the reverse osmosis membrane reactor for absorption. In some embodiments of the invention, the regenerator comprises a low pressure steam which strips the $CO_2$ gas and regenerates the solvent. In some embodiments of the invention, the system further comprises a heat exchanger which facilitates energy transfer from high temperature lean solvent to low temperature rich solvent. In some embodiments of the invention, the aqueous absorbent further comprises a water-soluble polymer (e.g. polyethylene glycol (PEG)). The concentration of PEG is in the range of about 0.01 kg/L~1 kg/L. Number-average molecular weight ($M_n$) of PEG is in the range of about 150~1,000,000. In some embodiments of the invention, the two absorbers are adopted to absorb $SO_2$ and $CO_2$ separately. In the amine regenerator, lower phase is pumped out for $SO_2$ scrubbing, upper phase is pumped out for $CO_2$ scrubbing. The $SO_2$ absorber is in the upstream, and the $CO_2$ absorber is in the downstream. In some embodiments of the invention, the absorber further comprises a water wash system and a condense system, which collects amine and water from treated gas stream. In some embodiments of the invention, the temperature in the amine regenerator is in the range of about 20° C.~100° C. In some embodiments of the invention, the potassium bicarbonate and potassium sulfate/sulfite slurry is separated from the amine regenerator by a unit of a rotating filter, a stationary filter, a cyclone, a hydrocyclone, or a sedimentation equipment. In some embodiments of the invention, the slurry coming from the amine regenerator is pumped by a peristaltic slurry pump, or a centrifugal slurry pump. In some embodiments of the invention, the amine regenerator is placed right above the potassium carbonate regenerator, wherein the slurry transfers to the potassium carbonate regenerator by gravity (i.e., no slurry pump is adopted). In some embodiments of the invention, the potassium carbonate regenerator produces concentrated potassium carbonate solution for absorbent regeneration. The potassium sulfate/sulfite solid is separated by a precipitator soon after the potassium carbonate solution generates. In some embodiments of the invention, the potassium carbonate regenerator produces potassium carbonate solid, which is used for absorbent regeneration. In some embodiments of the invention, the potassium carbonate regenerator comprises a reactor and a reboiler. In some embodiments of the invention, the potassium carbonate regenerator comprises a heat exchanger. The waste heat coming from flue gas is transferred to the reactor by the heat exchanger. In some embodiments of the invention, the temperature in the reactor is lower than the temperature in the reboiler. The temperature in the reactor is in a range of about 60° C.~100° C., and the temperature in the reboiler is in a range of about 80° C.~270° C. In some embodiments of the invention, the pressure in the potassium carbonate regenerator is in a range of about 100 kPa~7 MPa. In some embodiments of the invention, the ammonium catalyst is ammonium carbamate, ammonium bicarbonate, ammonium carbonate, ammonium hydroxide, or a mixture thereof. In some embodiments of the invention, the concentration of the ammonium catalyst in the potassium carbonate regenerator is in a range of 0.01~3 mole/L. In some embodiments of the invention, the potassium carbonate produced from the potassium carbonate regenerator contains less than 10 ppm ammonium catalyst. In some embodiments of the invention, the potassium carbonate regenerator comprises a water wash system and a condenser, which collects the evaporated ammonium catalyst from the $CO_2$ gas stream. In some embodiments of the invention, the potassium carbonate regenerator comprises a slurry wash system and a condenser. Wherein potassium bicarbonate slurry is adopted to wash down ammonium catalyst from the $CO_2$ gas stream. In some embodiments of the invention, no ammonium catalyst is adopted. In some embodiments of the invention, the system comprises a configuration selected from the group consisting of configurations described in FIGS. 2, 8, 9, 14, and 15.

The following are particular embodiments of the invention:

A method of capturing $CO_2$, comprising: (a) providing the system of claim 1, (b) introducing a gas stream into the absorber, (c) contacting $CO_2$ in the gas stream with a solution comprising $K_2CO_3$ to produce a slurry comprising $KHCO_3$, and (d) contacting the $KHCO_3$ in the slurry with a regenerator rate promoter such that $K_2CO_3$, is produced.

A method for capturing $CO_2$ and/or $SO_2$ from a gas stream in an absorber, wherein the flue gas is passed through an aqueous solution containing: an absorbent comprising of at least an amine and/or amino acid salts, wherein the $CO_2$ and/or $SO_2$ is absorbed; the $CO_2$ and/or $SO_2$-rich solution is transported to an amine regenerator, wherein an aqueous alkali carbonate extracts $CO_2$ and/or $SO_2$ from the $CO_2$ and/or $SO_2$-rich solution forming an aqueous alkali bicarbonate and alkali sulfate/sulfite slurry and regenerating the absorbent, i.e. $CO_2$ and/or $SO_2$-lean absorbent solution; the said aqueous alkali bicarbonate and alkali sulfate/sulfite slurry is transported to an alkali carbonate regenerator, wherein ammonium species catalyzes the decomposition of alkali bicarbonate resulting in the regeneration of alkali carbonate and production of concentrated $CO_2$ gas; the sulfate/sulfite slurry is precipitated out of the carbonate solution.

In some embodiments of the invention, step (d) further comprises heating the slurry to increase the rate of $K_2CO_3$ production. In some embodiments of the invention, the $K_2CO_3$ produced in step (d) is reused in step (c) in the solution. In some embodiments of the invention, the introducing the gas stream step is continuous. In some embodiments of the invention, the gas stream is a waste gas produced from a process that produces $CO_2$ and/or $NH_3$.

The invention possesses one or more of the following unique features:

1. Chemical transformation of the absorbed $CO_2$ (from amine to $K_2CO_3$, and then to $NH_2CO_2NH_4$), resulting in a significant reduction of energy demand in the production of concentrated CO₂ gas. This is due to reduced sensible and latent heat for water (reduced water content due to the slurry), low decomposition temperature (small ΔT) and small heat capacity of chemicals in the regenerator.

2. Chemical transformation of the absorbed $SO_2$ (from amine to $K_2CO_3$), resulting in the production of $K_2SO_3/SO_4$, a valuable fertilizer. $K_2SO_4$ can be further converted to ammonium sulfate, a even more valuable fertilizer.

3. Use concentrated amine for $CO_2$ and/or $SO_2$ absorption in the absorber to allow 1) ready separation of regenerated solvent from salts (salting out effect), 2) presence of excess concentration of amine over sulfite/sulfate in solvent for $CO_2$ absorption, and 3) effective utilization of flue gas energy in the regenerator (due to small L/G).

4. $SO_2$ is removed from the amine solvent by reacting with $K_2CO_3$, resulting in the production of $K_2SO_3/SO_4$ precipitate (due to their low solubility). In the conventional solvent system, amine cannot be regenerated by steam stripping if $SO_2$ is present (heat stable salt). By taking the chemical transformation route, simultaneous removal of $CO_2$ and $SO_2$ in one absorber can be realized.

The invention having been described, the following examples are offered to illustrate the subject invention by way of illustration, not by way of limitation.

Example 1

Ammonium Carbamate as Rate Promoter

A novel stripping method for $CO_2$ capture and regeneration from flue gas of the coal-fired power plant is introduced. With some rate promoters, such as ammonium carbamate, organic amines, or physical solvents, potassium bicarbonate slurry was converted to potassium carbonate solution by stripping. Both high temperature (as high as 120° C. by using high-pressure stripper) and low temperature (as low as 90° C. by using hot water) stripping conditions are discussed herein.

Ammonium carbamate was adopted as rate promoter because of its weak base nature. Briefly, there are three different stripping processes: ambient-pressure stripper only process; high-pressure stripper only process; and ambient-pressure and high-pressure two strippers process.

Chemical reactions in ambient-pressure stripper. The chemical reactions of ammonium carbamate promoted potassium bicarbonate slurry stripping process in ambient-pressure stripper are list in Equations 13-15.

$$2KHCO_3(s)+NH_2COONH_4(s)+H_2O \rightarrow K_2CO_3(aq)+ 2NH_4HCO_3(s) \quad (13)$$

$$2NH_4HCO_3(s) \rightarrow NH_2COONH_4(aq)+CO_2(g)+2H_2O(l) \quad (14)$$

From Equations 13 and 14, it can be seen that the ammonium carbamate was recycled. At the end of stripping process, the ammonium carbamate was removed from slurry by heating the slurry to about 105° C., as shown in Equation 15.

$$NH_2COONH_4(aq) \rightarrow 2NH_3(g)+ CO_2(g) \rightarrow NH_2COONH_4(s) \quad (15)$$

Figure 3:
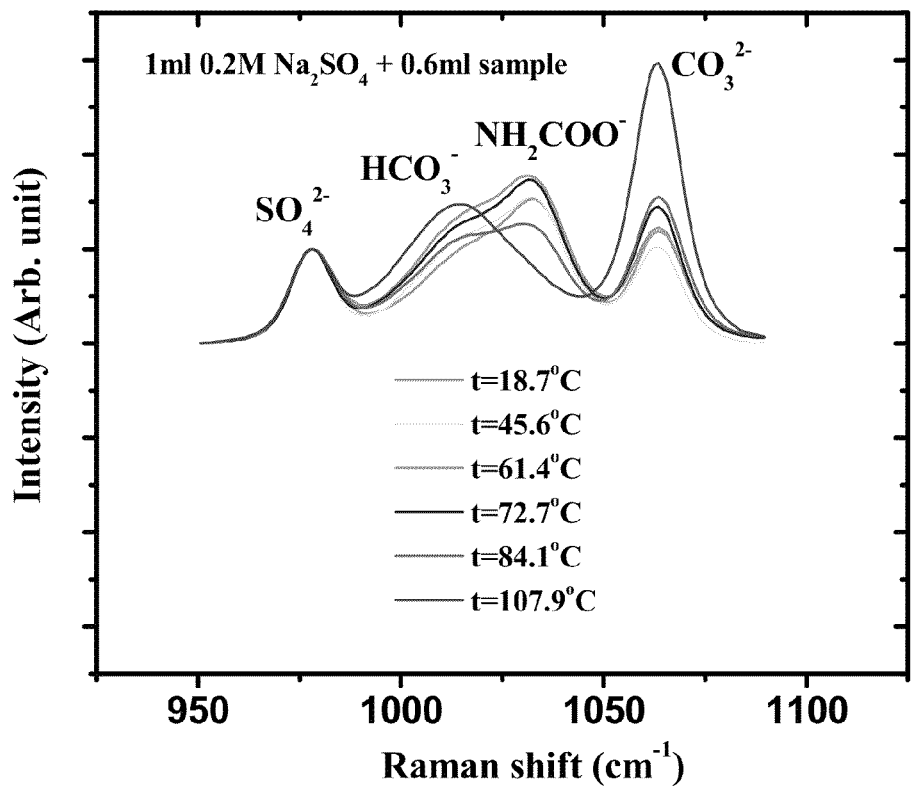
FIG. 3 shows Raman spectra of $KHCO_3$ slurry with ammonium carbamate at different stripping temperature.

The recycle of ammonium carbamate would be performed at an elevated pressure and temperature environment, which facilitated the recovering of the heat of reaction. From FIG. 3, it can be seen that all the ammonium carbamate was removed totally from slurry when the temperature was 107.9° C., because at that temperature, there was no peak of carbamate.

In the ambient-pressure stripper, the initial concentration of potassium bicarbonate in slurry, the concentration of ammonium carbamate, and the stripping temperature were optimized. The detailed data are shown in Table 1-3.

TABLE 1

Effect of water content in KHCO₃ slurry on energy demand.

| | | | | |
|---|---|---|---|---|
| Water (wt %) | 26.52 | 32.49 | 36.62 | 41.87 |
| KHCO₃ added (g(mole)) | 20.02 (0.20) | 15.01 (0.15) | 12.50 (0.12) | 10.00 (0.10) |
| H₂O added (g(mole)) | 10.04 (0.56) | 10.03 (0.56) | 10.02 (0.56) | 10.01 (0.56) |
| NH₂COONH₄ added (g(mole)) | 7.79 (0.10) | 5.82 (0.07) | 4.84 (0.06) | 3.90 (0.05) |
| Temp. in Stripper (° C.) | 109.3 | 107.6 | 105.5 | 102.8 |
| pH @ room temperature (° C.) | 11.45@25.7 | 11.43@25.5 | 11.38@23.3 | 11.09@24.6 |
| K₂CO₃ produced (g(mole)) | 4.91 (0.04) | 4.80 (0.03) | 4.65 (0.03) | 4.11 (0.03) |
| KHCO₃ precip. (g(mole)) | 11.72 (0.12) | 6.31 (0.06) | 4.24 (0.04) | 2.40 (0.02) |
| CO₂ produced (g(mole)) | 1.56 (0.04) | 1.53 (0.03) | 1.48 (0.03) | 1.31 (0.03) |
| KHCO₃ (kg/kg CO₂) | 12.80 | 9.82 | 8.44 | 7.65 |
| Water (kg/kg CO₂) | 6.42 | 6.56 | 6.76 | 7.66 |
| NH₂COONH₄ (kg/kg CO₂) | 4.98 | 3.81 | 3.27 | 2.99 |
| Sensible heat (kJ/kg CO₂) | 1382.59 | 1257.80 | 1195.42 | 1232.31 |
| Latent heat (kJ/kg CO₂) | 289.00 | 295.54 | 304.60 | 344.99 |
| Enthalpy (kJ/kg CO₂) | 1478.71 | 1478.71 | 1478.71 | 1478.71 |
| Total energy (kJ/kg CO₂) | 3150.30 | 3032.05 | 2978.74 | 3056.01 |
| Stripping ratio (%) | 86.16 | 80.32 | 81.99 | 78.65 |

TABLE 2

Carbamate optimization results of KHCO₃—NH₂COONH₄-Water stripping system in ambient-pressure stripper only process.

| | | | | |
|---|---|---|---|---|
| Carbamate (wt %) | 17.7 | 12.0 | 4.4 | 0ᵃ |
| KHCO₃ added (g(mole)) | 12.50 (0.12) | 12.51 (0.12) | 12.53 (0.12) | 12.50 (0.12) |
| H₂O added (g(mole)) | 10.02 (0.56) | 10.02 (0.56) | 10.02 (0.56) | 10.01 (0.56) |
| NH₂COONH₄ added (g(mole)) | 4.84 (0.06) | 3.07 (0.04) | 1.03 (0.01) | 0 (0) |
| Temp. in Stripper (° C.) | 105.5 | 107.1 | 106.1 | 109.8 |
| pH @ room temperature (° C.) | 11.38@23.3 | 11.42@24.2 | 11.27@26.7 | 11.00@26.1 |
| K₂CO₃ produced (g(mole)) | 4.65 (0.03) | 4.74 (0.03) | 4.67 (0.03) | 4.41 (0.03) |
| KHCO₃ precip. (g(mole)) | 4.24 (0.04) | 4.52 (0.05) | 4.23 (0.04) | 4.08 (0.04) |
| CO₂ produced (g(mole)) | 1.48 (0.03) | 1.51 (0.03) | 1.49 (0.03) | 1.40 (0.03) |

TABLE 2-continued

Carbamate optimization results of KHCO$_3$—NH$_2$COONH$_4$-Water stripping system in ambient-pressure stripper only process.

| | | | | |
|---|---|---|---|---|
| KHCO$_3$ (kg/kg CO$_2$) | 8.44 | 8.30 | 8.43 | 8.91 |
| Water (kg/kg CO$_2$) | 6.76 | 6.64 | 6.74 | 7.13 |
| NH$_2$COONH$_4$ (kg/kg CO$_2$) | 3.27 | 2.03 | 0.69 | 0 |
| Sensible heat (kJ/kg CO$_2$) | 1195.42 | 1202.96 | 1203.57 | 1344.27 |
| Latent heat (kJ/kg CO$_2$) | 304.60 | 299.13 | 303.72 | 321.34 |
| Enthalpy (kJ/kg CO$_2$) | 1478.71 | 1478.71 | 1478.71 | 1478.71 |
| Total energy (kJ/kg CO$_2$) | 2978.74 | 2980.80 | 2986.00 | 3144.32 |
| Stripping ratio (%) | 81.99 | 86.30 | 81.86 | 76.17 |

$^a$There was no ammonia removing process (30 min blown by air and in oil bath) in this experiment.

TABLE 3

Data of KHCO$_3$—NH$_2$COONH$_4$-Water stripping system with different stripping temperature in the ambient-pressure stripper only process.

| | | |
|---|---|---|
| Temp. in Stripper (° C.) | 105.5 | 91.6 |
| KHCO$_3$ added (g(mole)) | 12.50 (0.12) | 12.51 (0.12) |
| H$_2$O added (g(mole)) | 10.02 (0.56) | 10.02 (0.56) |
| NH$_2$COONH$_4$ added (g(mole)) | 4.84 (0.06) | 4.94 (0.06) |
| pH @ room temperature (° C.) | 11.38@23.3 | 10.57@23.5 |
| K$_2$CO$_3$ produced (g(mole)) | 4.65 (0.03) | 2.71 (0.02) |
| KHCO$_3$ precip. (g(mole)) | 4.24 (0.044) | 6.474 (0.064) |
| CO$_2$ produced (g(mole)) | 1.484 (0.03) | 0.86 (0.02) |
| KHCO$_3$ (kg/kg CO$_2$) | 8.44 | 14.49 |
| Water (kg/kg CO$_2$) | 6.76 | 11.62 |
| NH$_2$COONH$_4$ (kg/kg CO$_2$) | 3.27 | 5.72 |
| Sensible heat (kJ/kg CO$_2$) | 1195.42 | 1617.54 |
| Latent heat (kJ/kg CO$_2$) | 304.60 | 523.22 |
| Enthalpy (kJ/kg CO$_2$) | 1478.71 | 1478.71 |
| Sensible heat (kJ/kg solution) | 64.73 | 50.82 |
| Latent heat (kJ/kg solution) | 16.49 | 16.44 |
| Enthalpy (kJ/kg solution) | 80.06 | 46.46 |
| Total energy (kJ/kg CO$_2$) | 2978.74 | 3619.47 |
| Total energy (kJ/kg solution) | 161.28 | 113.72 |
| Stripping ratio (%) | 81.99 | 65.39 |

From the view of stripping energy, the optimum mass ratio between potassium bicarbonate and water was 5:4.

The stripping energies were almost the same when the mass of ammonium carbamate varied. From FIG. 4, it can be seen that, the stripping rate of slurry with 12 wt % ammonium carbamate was very close to the stripping rate of slurry with 17.7 wt % ammonium carbamate, therefore, the optimum concentration of ammonium carbamate was 12 wt %.

The optimum mass ratio of KHCO$_3$:water:NH$_2$COONH$_4$ was 25:20:6.

It can be seen that, higher stripping temperature facilitated the reduction of stripping energy. The optimum stripping temperature in ambient-pressure stripper was about 105° C., which was the boiling point of the slurry at ambient pressure.

The lowest stripping energy in ambient-pressure stripper was 2979 kJ/kg CO$_2$.

High-Pressure Stripper Only Process.

It was found from the experiment that, ammonium carbamate could hardly be removed totally from slurry at elevated pressure, because of the higher solubility of ammonia at that pressure. Therefore, as the rate promoter, the ammonium carbamate was not suitable for this flowsheet.

Ambient-Pressure and High-Pressure Two Strippers Process.

The temperature in the high-pressure stripper was about 120° C. Because of the high solubility of potassium bicarbonate at a high temperature, more potassium bicarbonate was sent into the high-pressure stripper before high-pressure stripping. There was no rate promoter in the high-pressure stripper. Only potassium bicarbonate-potassium carbonate mixed slurry was stripped in it. The chemical reactions in the ambient-pressure stripper were the same as the chemical reactions in the stripper of the ambient-pressure stripper only process. The chemical reaction in high-pressure stripper is shown in Equation 16.

$$2KHCO_3(s) \rightarrow K_2CO_3(aq) + H_2O(l) + CO_2(g) \quad (16)$$

Figure 11:
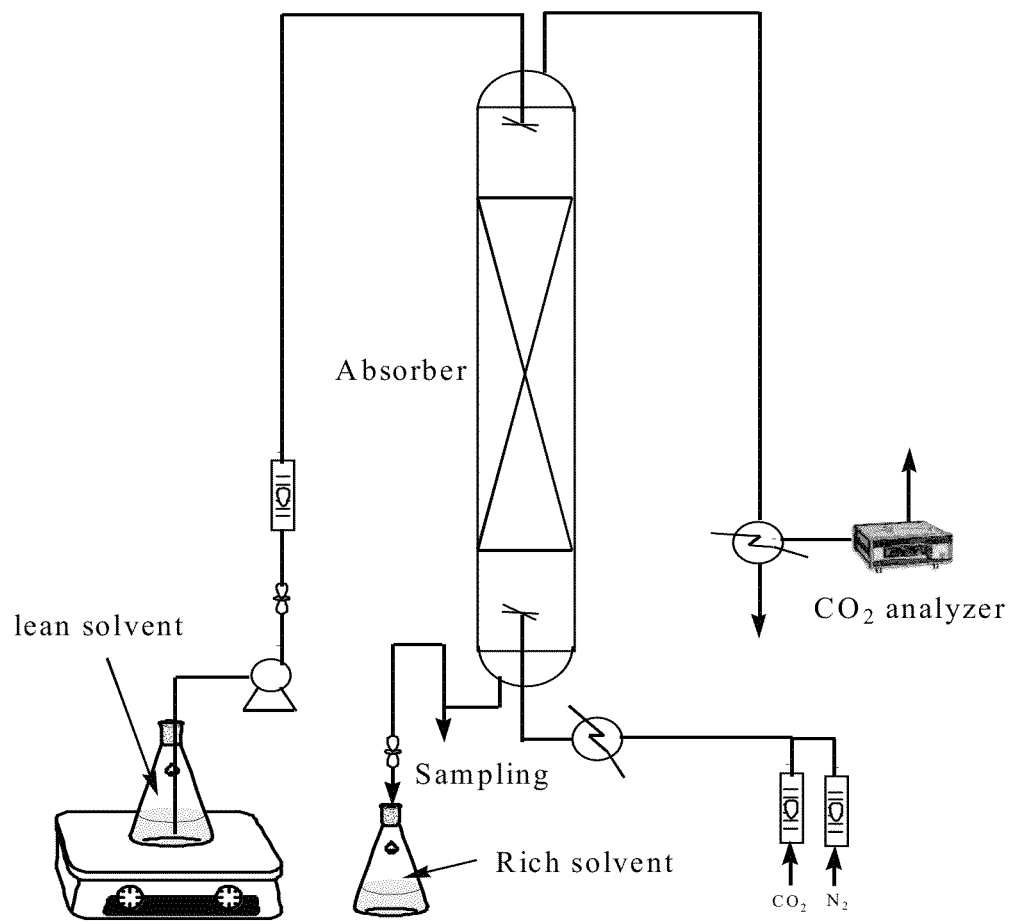
FIG. 11 shows a schematic diagram of the $CO_2$ absorption system.

The high-pressure stripping experiment was performed in a high-pressure autoclave with a condenser at the upstream of outlet valve. The optimizations of the concentration of KHCO$_3$ and the pressure were performed. The stripping temperature was set to be about 125° C. The detailed data for these optimizations are list in Tables 4-5. The stripping energies of slurry stripping processes with different initial KHCO$_3$ concentration, it can be seen that the optimum concentration of KHCO$_3$ at 120° C. stripping was 59 wt %. Here, the stripping pressure was set to be 1.4 atm. It can be seen from FIG. 11 that, the optimum pressure was 1.6 atm in the aspect of minimum stripping energy. The concentration of KHCO$_3$ was 59 wt %, and the stripping temperature was 125° C. Therefore, the optimum condition for high-pressure stripper was: 59 wt % KHCO$_3$ initial concentration, 1.6 atm stripping pressure, about 120° C. stripping temperature. The minimum stripping energy was 2683 kJ/kg CO$_2$.

TABLE 4

The detailed KHCO$_3$ concentration optimization data in high-pressure stripper of two strippers process.

| | | | |
|---|---|---|---|
| KHCO$_3$ (wt %) | 55 | 59 | 62 |
| KHCO$_3$ added (g(mole)) | 28.18 (0.28) | 38.19 (0.38) | 48.17 (0.48) |
| K$_2$CO$_3$ added (g(mole)) | 23.65 (0.17) | 23.64 (0.17) | 23.65 (0.17) |
| Water added (g(mole)) | 50.04 (2.78) | 50.01 (2.78) | 50.01 (2.76) |
| Temp. in Stripper (° C.) | 128.1 | 126.5 | 130.7 |
| pH @ room temperature (° C.) | 11.36@26.9 | 11.43@21.0 | 11.44@21.5 |
| K$_2$CO$_3$ produced (g(mole)) | 33.97 (0.25) | 36.58 (0.26) | 35.48 (0.26) |
| KHCO$_3$ precip. (g(mole)) | 4.47 (0.04) | 12.98 (0.13) | 24.35 (0.24) |
| CO$_2$ produced (g(mole)) | 10.82 (0.25) | 11.65 (0.26) | 11.30 (0.26) |
| Sensible heat (kJ/kg CO$_2$) | 1098.69 | 1041.83 | 1170.33 |
| Latent heat (kJ/kg CO$_2$) | 208.37 | 193.36 | 199.36 |
| Enthalpy (kJ/kg CO$_2$) | 1478.71 | 1478.71 | 1478.71 |
| Total energy (kJ/kg CO$_2$) | 2785.77 | 2713.90 | 2848.41 |
| Stripping ratio (%) | 85.73 | 90.08 | 89.47 |

TABLE 5

The detailed pressure optimization data in high-pressure stripper of two strippers process.

| Pressure (atm) | 1.2 | 1.4 | 1.6 | 1.8 |
|---|---|---|---|---|
| $KHCO_3$ added (g(mole)) | 38.18 (0.38) | 38.19 (0.38) | 38.18 (0.38) | 38.19 (0.38-) |
| $K_2CO_3$ added (g(mole)) | 23.65 (0.17) | 23.64 (0.17) | 23.65 (0.17) | 23.65 (0.17) |
| Water added (g(mole)) | 50.00 (2.78) | 50.01 (2.78) | 50.01 (2.78) | 50.03 (2.78) |
| Temp. in Stripper (° C.) | 128.3 | 126.5 | 125.8 | 125.5 |
| pH @ room temperature (° C.) | 11.19@21.7 | 11.43@21.0 | 11.60@23.4 | 11.35@27.2 |
| $K_2CO_3$ produced (g(mole)) | 31.77 (0.23) | 36.58 (0.26) | 37.27 (0.27) | 33.67 (0.24) |
| $KHCO_3$ precip. (g(mole)) | 19.09 (0.19) | 12.98 (0.13) | 11.99 (0.12) | 16.15 (0.16) |
| $CO_2$ produced (g(mole)) | 10.12 (0.23) | 11.65 (0.26) | 11.87 (0.27) | 10.72 (0.24) |
| Sensible heat (kJ/kg $CO_2$) | 1224.53 | 1041.83 | 1014.29 | 1119.23 |
| Latent heat (kJ/kg $CO_2$) | 222.62 | 193.36 | 189.79 | 210.16 |
| Enthalpy (kJ/kg $CO_2$) | 1478.71 | 1478.71 | 1478.71 | 1478.71 |
| Total energy (kJ/kg $CO_2$) | 2925.87 | 2713.90 | 2682.79 | 2808.11 |
| Stripping ratio (%) | 87.23 | 90.08 | 90.26 | 87.57 |

Example 2

Amines as Rate Promoter

Besides ammonium carbamate, amines can be used as the rate promoter. Such amines include AMP and MDEA. AMP is a primary amine, and MDEA is a tertiary amine.

The chemical structure of AMP is shown as follows:

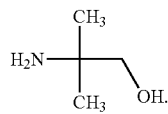

The chemical structure of MDEA is shown as follows:

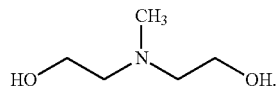

Figure 7:
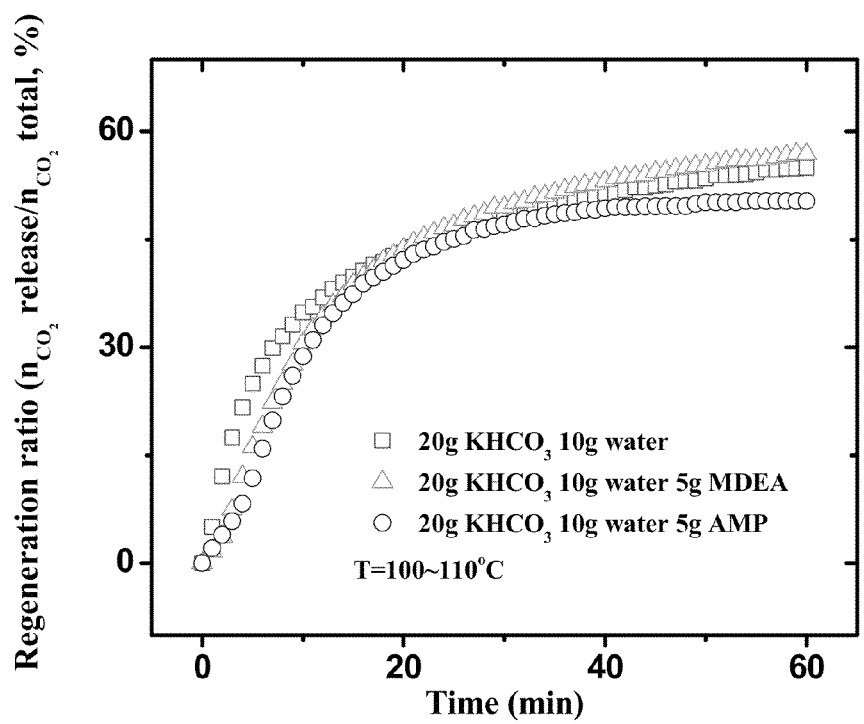
FIG. 7 shows the regeneration ratio vs. time characteristics of potassium bicarbonate slurry with MDEA, AMP and with nothing.

20 g Potassium bicarbonate, 10 g water, and 5 g MDEA were mixed together and stripped at 100~110° C. The regeneration ratio (define as mole amount of carbon dioxide release/mole amount of total releasable carbon dioxide) vs. time characteristics of 20 g-potassium-bicarbonate-10 g-water-5 g-MDEA system, 20 g-potassium-bicarbonate-10 g-water-5 g-AMP system and 20 g-potassium-bicarbonate-10 g-water system are shown in FIG. 7.

It can be seen that, the potassium bicarbonate slurry with MDEA as promoter exhibited a little higher stripping rate and regeneration ratio than the potassium bicarbonate slurry with no promoter; and the potassium bicarbonate slurry with AMP as promoter exhibited a little lower stripping rate and regeneration ratio than the potassium bicarbonate slurry with no promoter. That is to say, as rate promoter, the amine with less $pK_a$ exhibits a higher stripping ratio and stripping rate.

After stripping, the organic amines cannot dissolve in the high-concentration potassium carbonate solution because of the inter-molecular repulsive force. It is easy to separate organic amines and potassium carbonate solution. Therefore, the flowsheet of the whole absorption and regeneration process can be the ambient-pressure stripper only process, the high-pressure stripper only process, or the ambient-pressure and high-pressure two strippers process.

Besides small molecular amines, such as AMP and MDEA, polymers containing amine groups (such as polyethylenimine (PEI) or poly(propyleneimine) (PPI)), can also be used as stripping rate promoters. PEI is water soluble polymer. $CO_2$ can transfer from $KHCO_3$ to PEI in aqueous solution. PEI can be separated from potassium carbonate solution because of the intermolecular force. Alternatively, PEI can be attached to the surface of solid adsorbent, which would make it easily separable from solution.

Solid adsorbents for $CO_2$ capture (such as modified zeolites, resins, or metal-organic framework (MOF)) can also be used for extracting $CO_2$ from $KHCO_3$ slurry.

After stripping, the small molecular amines (such as AMP MDEA), polymer amines (such as PEI), and solid adsorbents (such as modified zeolites or resins) can be separated from aqueous solution. $CO_2$ can be transferred from absorption solvents to stripping solvents. Herein, not only potassium bicarbonate slurry, but traditional absorption solvents such as MEA aqueous solution or amino acid aqueous solution can be adopted as absorption solvents in this $CO_2$ transfer process.

Example 3

Physical Solvents as Rate Promoter

Besides ammonium carbamate and organic amines, physical solvents were also adopted as rate promoter. 2-Ethyl-1-hexanol (EH), a kind of physical solvent for $CO_2$, was selected for rate promotion investigation. The detailed data for 2-ethyl-1-hexanol promoted $KHCO_3$ slurry stripping process, and $KHCO_3$ slurry process without any promoter, are shown in Table 6.

TABLE 6

Data of $KHCO_3$ slurries stripping system with and without 2-ethyl-1-hexanol.

| | | |
|---|---|---|
| Temp. in Stripper (° C.) | 110.3 | 109.8 |
| $KHCO_3$ added (g(mole)) | 12.52 (0.12) | 12.50 (0.12) |
| $H_2O$ added (g(mole)) | 10.01 (0.56) | 10.01 (0.56) |
| 2-Ethyl-1-hexanol added (g(mole)) | 5.00 (0.04) | 0 (0) |
| pH @ room temperature (° C.) | 10.96@24.9 | 11.00@26.1 |
| $K_2CO_3$ produced (g(mole)) | 4.56 (0.03) | 4.41 (0.03) |
| $KHCO_3$ precip. (g(mole)) | 4.20 (0.04) | 4.08 (0.04) |
| $CO_2$ produced (g(mole)) | 1.45 (0.03) | 1.40 (0.03) |
| $KHCO_3$ (kg/kg $CO_2$) | 8.62 | 8.91 |
| Water (kg/kg $CO_2$) | 6.90 | 7.13 |
| 2-Ethyl-1-hexanol (kg/kg $CO_2$) | 3.44 | 0 |

TABLE 6-continued

Data of KHCO$_3$ slurries stripping system with and without 2-ethyl-1-hexanol.

| | | |
|---|---|---|
| Sensible heat (kJ/kg CO$_2$) | 1308.9048 | 1344.27 |
| Latent heat (kJ/kg CO$_2$) | 310.58 | 321.34 |
| Enthalpy (kJ/kg CO$_2$) | 1478.71 | 1478.71 |
| Total energy (kJ/kg CO$_2$) | 3098.20 | 3144.32 |
| Stripping ratio (%) | 79.82 | 76.17 |

Figure 8:
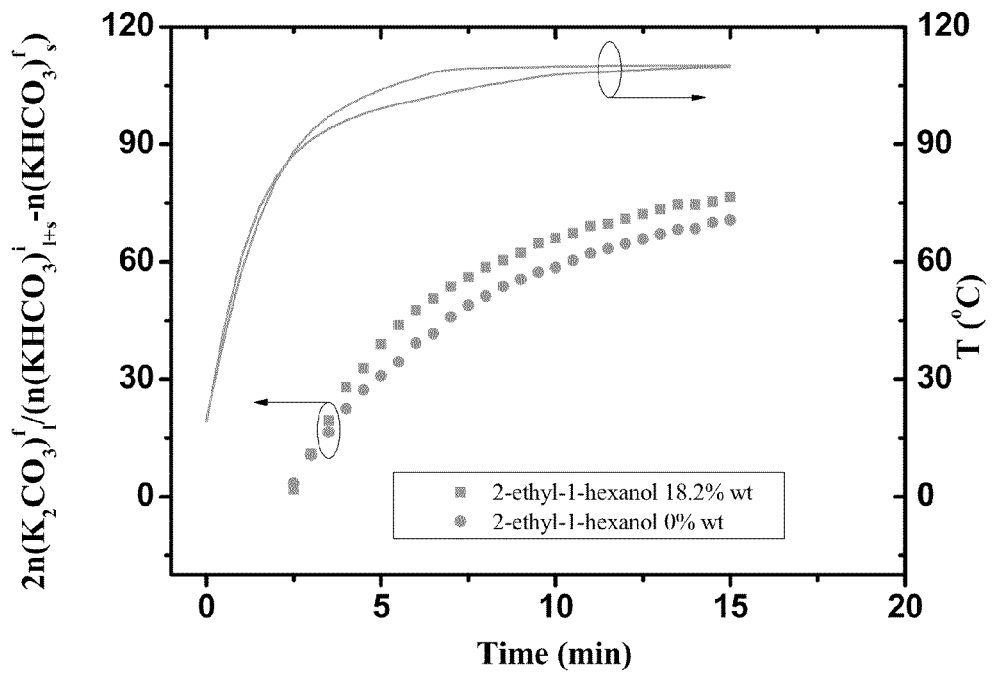
FIG. 8 shows the regeneration ratio and stripping temperature vs. time characteristics of $KHCO_3$-(2-ethyl-1-hexanol)-water system and $KHCO_3$-water system. The molar ratio between $KHCO_3$ and water was kept at 0.22.

It can be seen from FIG. 8 that, the regeneration ratio of 2-ethyl-1-hexanol promoted KHCO$_3$ slurry stripping process was a litter higher (3.65%) than the regeneration ratio of KHCO$_3$ slurry stripping process. The regeneration rate of 2-ethyl-1-hexanol promoted KHCO$_3$ slurry stripping process was also a little higher than the regeneration ratio of KHCO$_3$ slurry stripping process.

During stripping, the physical solvent cannot dissolve in the high-concentration potassium carbonate solution because of the insoluble nature of the physical solvent. It is easy to separate physical solvent and potassium carbonate solution. Therefore, the flowsheet of the whole absorption and regeneration process can be the ambient-pressure stripper only process, the high-pressure stripper only process, or the ambient-pressure and high-pressure two strippers process.

Besides traditional organic physical solvents, ionic liquids, such as 1-butyl-3-methylimidazolium hexafluorophosphate salt or 1-butyl-3-methylimidazolium tetrafluoroborate salt, can be used as rate promoter during potassium bicarbonate slurry stripping.

Example 4

Low Temperature Stripping Process of KHCO$_3$-Water-NH$_2$COONH$_4$ Slurry Stripping System The boiling point of KHCO$_3$-water-NH$_2$COONH$_4$ mixture slurry was about 80~90° C. at ambient pressure. From Table 3 in addendum, it can be seen that when the stripping temperature was as low as 90° C., the stripping energy was as much as 3619 kJ/kg CO$_2$, because of the low CO$_2$ release per kg solution. However, if the stripping energy could be from hot water or the mixture of hot water and water steam, instead of water steam only, more energy could be saved actually.

Example 5

CO$_2$ Absorption Rate Promoter

The gas absorption system (FIG. 11) comprises a packed glass column (25 mm i.d.×1 m h.) using 900× packing material. The temperature of the packed bed was controlled at 40° C. with a thermostatic water jacket surrounding the column. A simulated flue gas containing 15% CO$_2$ and 85% N$_2$ entered the bottom of the absorber through a distributer and flowed upward through the packing material. The solvent, comprised of an aqueous solution of potassium carbonate and a rate promoter, entered the top of the absorber through a distributer and moved downward. The gas phase was continuous and the liquid phase dispersed with the interface visible at the bottom of the packed section. Water baths were used to heat each phase to the operating temperature (40° C.). The flow rates of gas and liquid were controlled by mass controller and pump, respectively. The gas exiting the top of the column passed through a condenser to remove water vapor before entering a CO$_2$ analyzer. Loaded solvent exiting the absorber was collected by a flask. The pressure drop of the packed column was measured by a U-tube manometer. Once steady state conditions were attained, CO$_2$ outlet concentration and the pressure drop were recorded. The regenerated solvent was prepared by filtering KHCO$_3$ solid produced in rich solvent and refurbishing with K$_2$CO$_3$ equivalent to one half, in mole, of KHCO$_3$ removed.

Experiment 1

Figure 12:
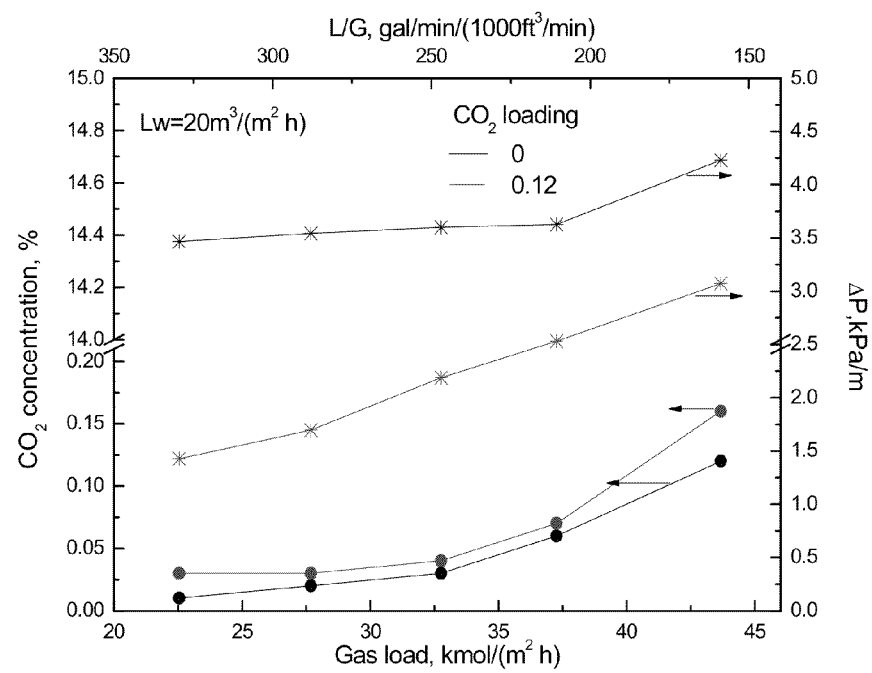
FIG. 12 shows the effect of gas load on $CO_2$ absorption and pressure drop. Absorbent employed was an aqueous solution of 2.5M $K_2CO_3$/2M $PZC_2H_4OH$ at two $CO_2$ loadings: 0 and 0.12. Flue gas initially contains 15% $CO_2$ and the absorption took place at 40° C.

1-(2-hydroxyethyl)piperazine (PZC$_2$H$_4$OH, i.e. HN(C$_2$H$_4$)$_2$NC$_2$H$_4$OH) was used as a CO$_2$ absorption rate promoter in aqueous K$_2$CO$_3$ solution. To our knowledge, PZC$_2$H$_4$OH has not been proposed for CO$_2$ capture in the past. FIG. 12 shows the effect of gas load (or liquid to gas ratio, L/G) on CO$_2$ absorption and pressure drop across the absorption column. Absorbent employed was an aqueous solution of 2.5M K$_2$CO$_3$/2M PZC$_2$H$_4$OH at two CO$_2$ loadings: 0 and 0.12. The absorption of CO$_2$ can be described by the reactions:

$$CO_2 + H_2O + CO_3^{2-} \leftrightarrow 2HCO_3^{-} \tag{17}$$

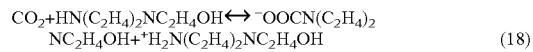

$$CO_2 + HN(C_2H_4)_2NC_2H_4OH \leftrightarrow {}^-OOCN(C_2H_4)_2NC_2H_4OH + {}^+H_2N(C_2H_4)_2NC_2H_4OH \tag{18}$$

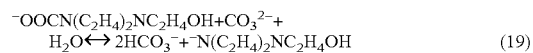

$${}^-OOCN(C_2H_4)_2NC_2H_4OH + CO_3^{2-} + H_2O \leftrightarrow 2HCO_3^{-} + N(C_2H_4)_2NC_2H_4OH \tag{19}$$

When liquid load was 20 m$^3$/(m$^2$ h), CO$_2$ outlet concentration and pressure drop increased with the increase of gas load (i.e. gas molar flow rate per area of packing section) or the decrease of liquid to gas ratio (L/G). The results show that CO$_2$ concentration decreased from 15% to less than 0.2% (i.e. CO$_2$ removal efficiency was more than 98%), which indicates that PZC$_2$H$_4$OH is a very effective rate promoter.

Experiment 2

The regenerated solvent of 2.5M K$_2$CO$_3$/2M PZC$_2$H$_4$OH was studied for CO$_2$ absorption. The regenerated solvent was prepared by filtering KHCO$_3$ solid produced after CO$_2$ absorption by the fresh solvent and subsequently refurbished with K$_2$CO$_3$ equivalent to one half, in mole, the amount of KHCO$_3$ removed.

Figure 13:
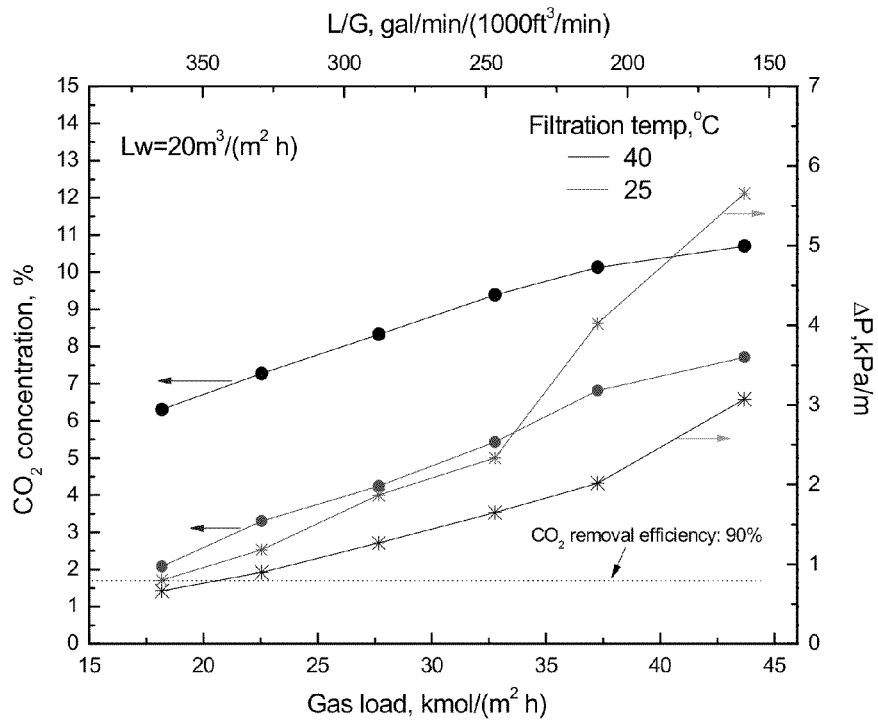
FIG. 13 shows the effect of gas load on $CO_2$ absorption and pressure drop. Absorbent employed was a regenerated 2.5M $K_2CO_3$/2M $PZC_2H_4OH$, with $KHCO_3$ solid filtered when the solution was at 25° C. and 40° C. Flue gas initially contains 15% $CO_2$ and the absorption took place at 40° C.

FIG. 13 shows the effect of gas load (or L/G) on CO$_2$ absorption and pressure drop. Absorbent employed was a regenerated 2.5M K$_2$CO$_3$/2M PZC$_2$H$_4$OH, with KHCO$_3$ solid filtered from the rich solvent at 25° C. and 40° C.

When regenerated solvent was used to re-absorb CO$_2$, CO$_2$ outlet concentration and pressure drop also increased with the increase of gas load. As gas load increased from 18 to 44 kmol/m$^2$ h, CO$_2$ outlet concentration increasing from 6.0% to 10.7% and 2.1% to 7.5% with regenerated solvent having KHCO$_3$ solid removed at 40° C. and 25° C., respectively. KHCO$_3$ solubility decreases with the decrease of temperature; consequently, a larger amount of KHCO$_3$ was removed from the solution at 25° C. than 40° C. As a result, a larger amount of K$_2$CO$_3$ was refurbished to the solution, which leads to the decrease of CO$_2$ loading in the solution. It is expected that CO$_2$ absorption is more efficient with solvent having a smaller CO$_2$ loading.

Experiment 3

Figure 14:
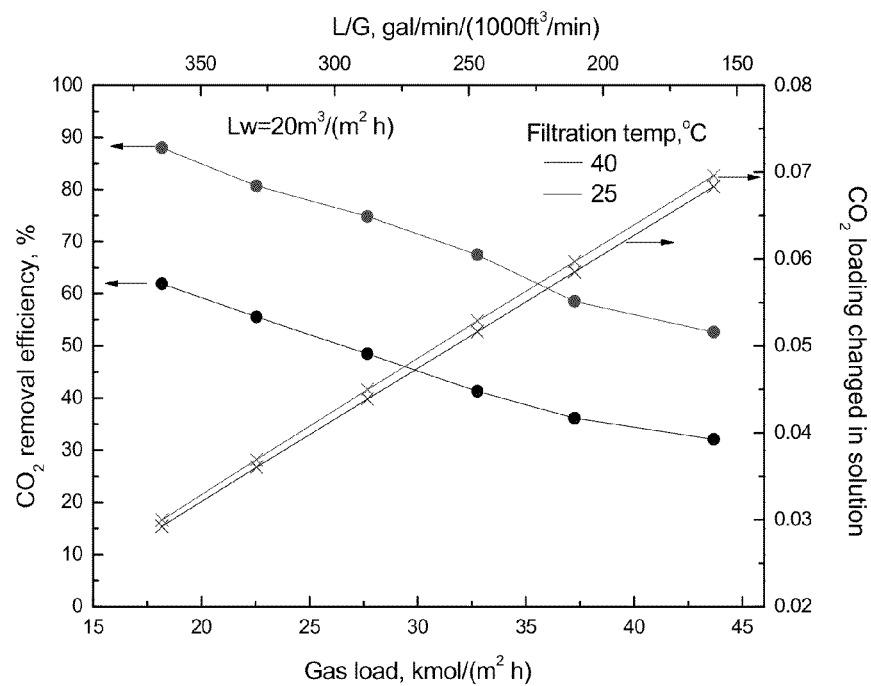
FIG. 14 shows the effect of gas load on $CO_2$ removal efficiency and $CO_2$ loading in solvent. Absorbent employed was a regenerated 2.5M $K_2CO_3$/2M $PZC_2H_4OH$, with $KHCO_3$ solid filtered when the solution was at 25° C. and 40° C. Flue gas initially contains 15% $CO_2$ and the absorption took place at 40° C.

CO$_2$ removal efficiency by the regenerated solvent of 2.5M K$_2$CO$_3$/2M PZC$_2$H$_4$OH was determined as a function of gas load, gas to liquid ratio (L/G), and solvent CO$_2$ loading. CO$_2$ removal efficiency of near 90% was obtained with regenerated solvent having KHCO$_3$ solid removed at 25° C. and using a gas load of 18 kmol/m$^2$ h (FIG. 14).

Experiment 4

Piperazine (PZ) has previously been studied as a rate promoter in aqueous K$_2$CO$_3$ solution for CO$_2$ absorption. It was found that CO$_2$ removal efficiency by K$_2$CO$_3$/PZ solutions can be more effective than that by MEA. However, past effort was on promoting absorption efficiency without producing solid precipitates of KHCO$_3$ and/or PZ. On the contrary, the approach of this invention requires a solvent that would produce KHCO$_3$ solid after CO$_2$ absorption, although promoter precipitation is not preferable.

Figure 15:
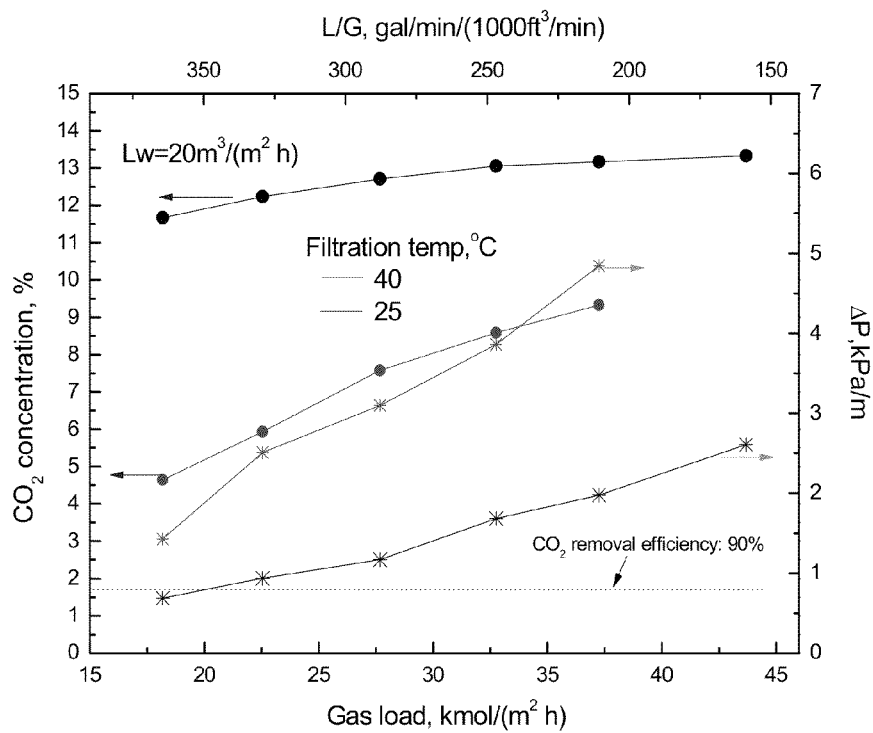
FIG. 15 shows the effect of gas load on $CO_2$ absorption and pressure drop. Absorbent employed was a regenerated 2M $K_2CO_3$/1.5M PZ, with $KHCO_3$ solid filtered when the solution was at 25° C. and 40° C. Flue gas initially contains 15% $CO_2$ and the absorption took place at 40° C.

Effect of gas load on CO$_2$ absorption by regenerated 2M K$_2$CO$_3$/1.5M PZ solution was studied. Two regenerated solutions were tests, one having KHCO$_3$ solid filtered from the rich solvent at 25° C., and the other at 40° C. CO$_2$ outlet concentration was 4.8% and 11.6% (corresponding to a CO$_2$ removal efficiency of 68% and 23%, respectively) at a gas load of 18 kmol/m$^2$ h using a solvent regenerated at 25° C. and 40° C., respectively (FIG. 15). Apparently, CO$_2$ removal efficiency by regenerated 2M K$_2$CO$_3$/1.5M PZ was not as good as that (Example 3) by regenerated 2.5M K$_2$CO$_3$/2M PZC$_2$H$_4$OH under the same operating condition.

Experiment 5

The regenerated solvent of 2.5M K$_2$CO$_3$/2M PZC$_2$H$_4$OH/0.5M AMP was studied for CO$_2$ absorption. The regenerated solvent was prepared by filtering KHCO$_3$ solid produced after CO$_2$ absorption by the fresh solvent and subsequently refurbished with K$_2$CO$_3$ equivalent to one half, in mole, the amount of KHCO$_3$ removed.

When regenerated solvent was used to re-absorb CO$_2$, CO$_2$ outlet concentration and pressure drop also increased with the increase of gas load. As gas load increased from 18 to 44 kmol/m$^2$ h, CO$_2$ outlet concentration increasing from 1.02% to 3.92% and 0.09% to 3.31% with regenerated solvent having KHCO$_3$ solid removed at 40° C. and 25° C., respectively. KHCO$_3$ solubility decreases with the decrease of temperature; consequently, a larger amount of KHCO$_3$ was removed from the solution at 25° C. than 40° C. As a result, a larger amount of K$_2$CO$_3$ was refurbished to the solution, which leads to the decrease of CO$_2$ loading in the solution.

Example 6

KHCO$_3$ Decomposition Rate Promoter

Solvent regeneration energy demand depends on reaction enthalpy, sensible and latent heats. Reaction enthalpy is the difference of enthalpies between reactants and products, which is a state function, i.e. the change in enthalpy for a chemical reaction is the same whether the reaction takes place in one step or a series steps. Sensible heat is related to the amount of water in solvent and temperature differential for the conversion of solvent from rich to lean; therefore, it is advantageous to use an absorbent possessing a low decomposition temperature and in a concentrated aqueous mixture, such as a slurry. Low temperature decomposition may use waste heat from power plants, which further contribute to the saving of energy demand. Latent heat and the heat of dissolution must also be minimized in order to reduce the energy demand.

KHCO$_3$ solid produced in the absorber needs to be decomposed to form K$_2$CO$_3$ for reuse and CO$_2$ for compressed to supercritical liquid. The enthalpy of this conversion can proceed through the following three routes:

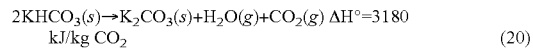
$$2KHCO_3(s) \rightarrow K_2CO_3(s)+H_2O(g)+CO_2(g) \; \Delta H°=3180 \; kJ/kg \; CO_2 \tag{20}$$

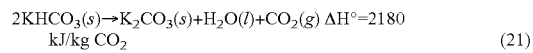
$$2KHCO_3(s) \rightarrow K_2CO_3(s)+H_2O(l)+CO_2(g) \; \Delta H°=2180 \; kJ/kg \; CO_2 \tag{21}$$

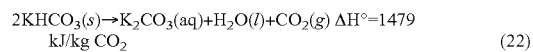
$$2KHCO_3(s) \rightarrow K_2CO_3(aq)+H_2O(l)+CO_2(g) \; \Delta H°=1479 \; kJ/kg \; CO_2 \tag{22}$$

It is apparent that the enthalpy of the decomposition of KHCO$_3$ to produce CO$_2$ depends on the phases in which products are finally formed. H$_2$O formed in liquid or gas phases have an enthalpy difference of 1000 kJ/kg CO$_2$. K$_2$CO$_3$ produced in aqueous or solid phases have an enthalpy difference of 701 kJ/kg CO$_2$.

The decomposition of KHCO$_3$ is endothermic. Among three routes mentioned above, the third route, producing aqueous K$_2$CO$_3$ and liquid H$_2$O, requires the smallest amount of energy. But, the task is to develop a cost-effective method to make it happen.

In view of the fact that heating a large quantity of solid KHCO$_3$ would encounter poor heat transfer and transport problems. And heating aqueous KHCO$_3$ solutions requires consuming a large amount of sensible heat because the bulk of solvent is water. Therefore, KHCO$_3$ aqueous slurry is adopted in this approach. The determination of an appropriate amount of water in slurry is thus necessary. Also necessary is the determination of the KHCO$_3$/NH$_2$CO$_2$NH$_4$ concentration ratio, temperature, pressure, and process configuration to obtain the least energy demand.

This invention discloses an approach involving the use of ammonium carbamate to facilitate the decomposition of KHCO$_3$ aqueous slurry to produce as much as K$_2$CO$_3$ and H$_2$O in aqueous phases and CO$_2$ in gas phase according to the following reaction schemes:

(1) Reaction of Potassium Bicarbonate and Ammonium Carbamate to Produce Ammonium Bicarbonate and Regenerate Potassium Carbonate

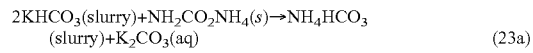
$$2KHCO_3(slurry)+NH_2CO_2NH_4(s) \rightarrow NH_4HCO_3(slurry)+K_2CO_3(aq) \tag{23a}$$

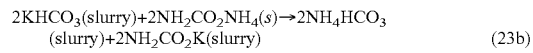
$$2KHCO_3(slurry)+2NH_2CO_2NH_4(s) \rightarrow 2NH_4HCO_3(slurry)+2NH_2CO_2K(slurry) \tag{23b}$$

(2) Decomposition of Ammonium Bicarbonate to Produce CO$_2$ Gas

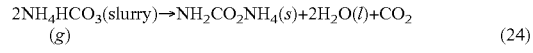
$$2NH_4HCO_3(slurry) \rightarrow NH_2CO_2NH_4(s)+2H_2O(l)+CO_2(g) \tag{24}$$

(3) Regeneration of Potassium Carbonate and Ammonium Carbamate

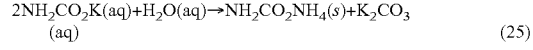
$$2NH_2CO_2K(aq)+H_2O(aq) \rightarrow NH_2CO_2NH_4(s)+K_2CO_3(aq) \tag{25}$$

The overall reaction is the decomposition of potassium bicarbonate to produce aqueous potassium carbonate, liquid water and release CO$_2$ gas.

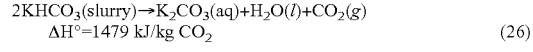
$$2KHCO_3(slurry) \rightarrow K_2CO_3(aq)+H_2O(l)+CO_2(g) \; \Delta H°=1479 \; kJ/kg \; CO_2 \tag{26}$$

Although the overall reaction is endothermic of 1479 kJ/kg CO$_2$; the actual energy demand is expected to be larger in practice because of the energy consumption and recovery efficiency in chemical processing.

However, an estimate of energy demand for the regeneration of K$_2$CO$_3$ from aqueous KHCO$_3$ slurry can be made by using the same procedure as that used for the calculation of 30 wt % MEA's energy demand as described below:

The amount of water in the slurry was based on the assumption that a saturated $K_2CO_3$ solution can be regenerated. The stripping temperature could be greater than 100° C. As a result, water can evaporate, but it is recovered as liquid by condensation. Consequently, the heat of evaporation, i.e. latent heat, is recovered, although it is not 100%. The latent heat recovering ratio per kg of water was assumed to be identical between $KHCO_3$ slurry and 30% MEA in proportional to their water content.

Tables 7-9 list the energy demand required for MEA, solid $KHCO_3$, and $KHCO_3$ slurry, respectively.

TABLE 7

Regeneration of 30 wt % MEA aqueous solution.

| | |
|---|---|
| $CO_2$ loading of rich phase (mole $CO_2$/mole MEA) | 0.4 |
| $CO_2$ loading of lean phase (mole $CO_2$/mole MEA) | 0.15 |
| Absorption temperature (° C.) | 55 |
| Regeneration temperature (° C.) | 120 |
| Latent heat (kJ/kg $CO_2$) | 676 |
| Sensible heat (kJ/kg $CO_2$) | 2191 |
| Reaction enthalpy (kJ/kg $CO_2$) | 1636 |
| Total regeneration heat (kJ/kg $CO_2$) | 4503 |
| Mass of MEA (kg/kg $CO_2$) | 5.55 |
| Mass of water (kg/kg $CO_2$) | 12.95 |

TABLE 8

Thermal decomposition of solid $KHCO_3$.

| | |
|---|---|
| Absorption temperature (° C.) | 40 |
| Regeneration temperature (° C.) | 200 |
| Latent heat (kJ/kg $CO_2$) | 0 |
| Sensible heat (kJ/kg $CO_2$) | 400 |
| Reaction enthalpy (kJ/kg $CO_2$) | 3180 |
| Total regeneration heat (kJ/kg $CO_2$) | 3580 |
| Mass of $KHCO_3$ (kg/kg $CO_2$) | 4.55 |
| Mass of water (kg/kg $CO_2$) | 0 |

TABLE 9

Regeneration of a saturated $K_2CO_3$ solution from $KHCO_3$ slurry.

| | |
|---|---|
| Absorption temperature (° C.) | 40 |
| Regeneration temperature (° C.) | 120 |
| Latent heat (kJ/kg $CO_2$) | 121 |
| Sensible heat (kJ/kg $CO_2$) | 633 |
| Reaction enthalpy (kJ/kg $CO_2$) | 1479 |
| Total regeneration heat (kJ/kg $CO_2$) | 2232 |
| Mass of $KHCO_3$ (kg/kg $CO_2$) | 4.55 |
| Mass of water (kg/kg $CO_2$) | 2.68 |

Tables 1-3 indicate that the regeneration energy demand of solid $KHCO_3$ and $KHCO_3$ slurry is estimated to be, respectively, about 80% and 50% of that of 30 wt % MEA.

Parametric study was performed to estimate the energy demand of $KHCO_3$ slurry under various water contents, concentrations, temperatures, and pressures. The energy demand per unit weight of $CO_2$ was determined by heating the slurry in a vessel and measuring the amount of $CO_2$ released at a given operating condition. And $CO_2$ released was determined by measuring the changes of the concentration of $KHCO_3$ and $K_2CO_3$ in the slurry by laser Raman spectroscopy since one mole of $K_2CO_3$ is generated for each mole of $CO_2$ released from $KHCO_3$.

Experiment 6

Heating a slurry with the initial composition of 10 ml water, 12.5 g $KHCO_3$, and 4.84 g $NH_2CO_2NH_4$ at 105.5° C. and 1 atm. produced 4.65 g $K_2CO_3$ and 1.48 g $CO_2$, and the pH in the solution was 11.38. The remaining $KHCO_3$ was in solution and precipitation. The total energy demand was estimated to be 2979 kJ/kg $CO_2$, including 1195 sensible heat, 305 latent heat, and 1479 enthalpy.

Experiment 7

Heating a slurry with the initial composition of 10 ml water, 15 g $KHCO_3$, and 5.82 g $NH_2CO_2NH_4$ at 107.6° C. and 1 atm. produced 4.80 g $K_2CO_3$ and 1.53 g $CO_2$, and the pH in the solution was 11.43. The total energy demand was estimated to be 3032 kJ/kg $CO_2$, including 1258 sensible heat, 295 latent heat, and 1479 enthalpy.

Experiment 8

Heating a slurry with the initial composition of 10 ml water, 10 g $KHCO_3$, and 3.9 g $NH_2CO_2NH_4$ at 102.8° C. and 1 atm. produced 4.1 g $K_2CO_3$ and 1.31 g $CO_2$, and the pH in the solution was 11.09. The total energy demand was estimated to be 3056 kJ/kg $CO_2$, including 1232 sensible heat, 345 latent heat, and 1479 enthalpy.

Experiment 9

Heating a slurry with the initial composition of 10 ml water, 20 g $KHCO_3$, and 7.8 g $NH_2CO_2NH_4$ at 109.3° C. and 1 atm. produced 4.91 g $K_2CO_3$ and 1.56 g $CO_2$, and the pH in the solution was 11.45. The total energy demand was estimated to be 3150 kJ/kg $CO_2$, including 1382 sensible heat, 289 latent heat, and 1479 enthalpy.

Experiment 10

Heating a slurry with the initial composition of 10 ml water, 12.5 g $KHCO_3$, and 3.07 g $NH_2CO_2NH_4$ at 107.1° C. and 1 atm. produced 4.74 g $K_2CO_3$ and 1.51 g $CO_2$, and the pH in the solution was 11.42. The total energy demand was estimated to be 2980 kJ/kg $CO_2$, including 1203 sensible heat, 299 latent heat, and 1479 enthalpy.

Experiment 11

Heating a slurry with the initial composition of 10 ml water, 12.5 g $KHCO_3$, and 1.03 g $NH_2CO_2NH_4$ at 106.1° C. and 1 atm. produced 4.67 g $K_2CO_3$ and 1.49 g $CO_2$, and the pH in the solution was 11.27. The total energy demand was estimated to be 2986 kJ/kg $CO_2$, including 1204 sensible heat, 304 latent heat, and 1479 enthalpy.

Experiment 12

Heating a slurry with the initial composition of 10 ml water, 12.5 g $KHCO_3$, and 4.84 g $NH_2CO_2NH_4$ at 105.5° C. and 1 atm. produced 4.65 g $K_2CO_3$ and 1.48 g $CO_2$, and the pH in the solution was 11.38. The total energy demand was estimated to be 2979 kJ/kg $CO_2$, including 1195 sensible heat, 305 latent heat, and 1479 enthalpy.

Experiment 13

Heating a slurry with the initial composition of 10 ml water, 12.5 g $KHCO_3$, and 4.84 g $NH_2CO_2NH_4$ at 91.6° C. and 1 atm. produced 2.7 g $K_2CO_3$ and 0.86 g $CO_2$, and the pH in the solution was 10.57. The total energy demand was estimated to be 3096 kJ/kg $CO_2$, including 1617 sensible heat and 1479 enthalpy.

Experiment 14

Heating a slurry with the initial composition of 50 ml water, 38.18 g $KHCO_3$, and 23.65 g $K_2CO_3$ at 128.3° C. and 1.2 atm. produced 31.77 g $K_2CO_3$ and 10.12 g $CO_2$, and the pH in the solution was 11.19. The total energy demand was estimated to be 2926 kJ/kg $CO_2$, including 1225 sensible heat, 223 latent heat, and 1479 enthalpy.

Experiment 15

Heating a slurry with the initial composition of 50 ml water, 38.18 g $KHCO_3$, and 23.65 g $K_2CO_3$ at 126.5° C. and 1.4 atm. produced 36.58 g $K_2CO_3$ and 11.65 g $CO_2$, and the pH in the solution was 11.43. The total energy demand was estimated to be 2714 kJ/kg $CO_2$, including 1042 sensible heat, 193 latent heat, and 1479 enthalpy.

Experiment 16

Heating a slurry with the initial composition of 50 ml water, 38.18 g $KHCO_3$, and 23.65 g $K_2CO_3$ at 125.8° C. and 1.6 atm. produced 37.27 g $K_2CO_3$ and 11.87 g $CO_2$, and the pH in the solution was 11.6. The total energy demand was estimated to be 2683 kJ/kg $CO_2$, including 1014 sensible heat, 190 latent heat, and 1479 enthalpy.

Experiment 17

Heating a slurry with the initial composition of 50 ml water, 38.18 g $KHCO_3$, and 23.65 g $K_2CO_3$ at 125.5° C. and 1.8 atm. produced 33.67 g $K_2CO_3$ and 10.72 g $CO_2$, and the pH in the solution was 11.35. The total energy demand was estimated to be 2808 kJ/kg $CO_2$, including 1119 sensible heat, 210 latent heat, and 1479 enthalpy.

Table 1 shows the effect of water content on energy demand at the molar ratio of $KHCO_3/NH_2CO_2NH_4$ of 2 in the slurry; although its molar ratio in solution was 1. This is because of the limited solubility of $KHCO_3$. This implies that $KHCO_3$ was equally distributed in liquid and solid phases. The regeneration was performed by heating the slurry at 1 atm.

The results indicate that the least energy demand (2978.7425 kJ/kg $CO_2$) was obtained when water content was 36.6% wt. using a $KHCO_3/NH_2COONH_4$ molar ratio of 2 at 1 atm. The energy demand obtained was greater than the calculated value (2231.87 kJ/kg $CO_2$). This is because the regenerated solution was not saturated with $K_2CO_3$ under the condition employed. Nevertheless, it is only ⅔ of that of 30% MEA.

The rate and extent of $KHCO_3$ that can be converted, by reacting with $NH_2CO_2NH_4$, to $K_2CO_3$ depend on reactant concentrations, temperature, and pressure. Our results indicated that between 60% and 75% of $KHCO_3$ were converted to $K_2CO_3$ at a temperature range of 80° C.-105° C. and 1 atm, when the molar ratio $KHCO_3/H_2O$ was 0.22 using 12%-18% wt. of $NH_2CO_2NH_4$ in the slurry. Aqueous $K_2CO_3$ regenerated this way was found to possess undetectable amount of $NH_2CO_2NH_4$ or other ammonium species. Because of the relatively low temperature involved, hot water produced from power plant waste heat may be applied to facilitate this conversion.

Experiment 18

In the stripper operated at around 1 atm, aqueous $KHCO_3$ slurry was heated by hot water to form a mixture of $K_2CO_3$ and $KHCO_3$ slurry. The decomposition of $KHCO_3$ can be promoted by $NH_2CO_2NH_4$ through Rx. (23). $NH_4HCO_3$ produced as a result of this reaction decomposed, at a much lower temperature than $KHCO_3$ does, to generate $CO_2$ and $NH_2CO_2NH_4$ according to Rx. (24). Further increase of temperature would cause $NH_2CO_2NH_4$ to decompose to form $NH_3$ and $CO_2$; but $NH_3$ and $CO_2$ can recombine to yield $NH_2CO_2NH_4$ in a condenser at an appropriate temperature and elevated pressure according to Rx (27).

$$NH_2CO_2NH_4 \leftrightarrow 2NH_3 + CO_2 \quad (27)$$

In the second stage stripper which was operated at greater than 1 atm, additional $KHCO_3$ solid may be added to the slurry, due to the greater solubility of $KHCO_3$ at higher temperature. The boiling point of solution increases with the increase of pressure. The slurry was heated to about 120° C. at elevated pressure to release additional $CO_2$, leading to additional $K_2CO_3$ formation. After the final solution was cooled down, a portion of dissolved $KHCO_3$ in solution would precipitate due to the smaller solubility at lower temperature, resulting in a larger carbonate/bicarbonate ratio and thus higher pH value in the regenerated solvent. This $K_2CO_3$ rich solution can then be used to regenerate absorption solvent for the next absorption process.

Table 10 shows the mass balance of two-stage regeneration.

TABLE 10

Mass balance of two-stage regeneration.

| | | Mass (kg/kg $CO_2$) | Amount of substance (kmol/kg $CO_2$) |
|---|---|---|---|
| Ambient-pressure stripper Input materials | $KHCO_3$(s) | 5.2311 | 0.0522 |
| | $H_2O$(l) | 4.1881 | 0.2325 |
| | $NH_2COONH_4$(s) | 1.2818 | 0.0164 |
| Ambient-pressure stripper Output Materials | $K_2CO_3$(aq) | 1.9803 | 0.0143 |
| | $KHCO_3$(slurry) | 2.3306 | 0.0233 |
| | $H_2O$(l) | 4.1881 | 0.2325 |
| | $CO_2$(g) | 0.6306 | 0.0143 |
| High-pressure stripper Input Materials | $K_2CO_3$(aq) | 1.9803 | 0.0143 |
| | $KHCO_3$(slurry) | 2.3306 | 0.0233 |
| | $H_2O$(l) | 4.1881 | 0.2325 |
| | $KHCO_3$(s) | 0.8766 | 0.0088 |
| High-pressure stripper Output Materials | $K_2CO_3$(aq) | 3.1407 | 0.0227 |
| | $KHCO_3$(aq) | 0.5166 | 0.0052 |
| | $H_2O$(l) | 4.1881 | 0.2325 |
| | $KHCO_3$(s) | 1.0103 | 0.0101 |
| | $CO_2$(g) | 0.3694 | 0.0084 |
| Total input | $KHCO_3$(s) | 6.1077 | 0.0610 |
| Total output | $KHCO_3$(s + aq) | 1.5269 | 0.0153 |
| | $K_2CO_3$(aq) | 3.1407 | 0.0227 |
| | $CO_2$(g) | 1.0000 | 0.0227 |

The energy demand can be calculated to be about 2683 kJ/kg $CO_2$, which is about 60% that of a 30% MEA system.

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

What is claimed is:

1. A system for capturing $CO_2$, comprising:
   (a) a first chemical reaction vessel comprising an amine and/or amino acid salt, for absorbing the $CO_2$ to produce an amine-COO compound and/or amino acid-COO compound in a $CO_2$-containing solution;
   (b) a second chemical reaction vessel comprising an aqueous alkali metal carbonate for extracting the $CO_2$ from the amine-COO compound and/or amino acid-COO compound in the $CO_2$-containing solution to form an alkali metal bicarbonate solid and regenerate the amine and/or amino acid salt; and
   (c) a third chemical reaction vessel for thermally regenerating the alkali metal carbonate from the alkali metal bicarbonate.

2. The system of claim 1, wherein the third chemical reaction vessel further comprises an ammonium catalyst for catalyzing the aqueous alkali metal bicarbonate into the alkali metal carbonate and $CO_2$ gas.

3. The system of claim 2, wherein the ammonium catalyst comprises ammonium carbonate, ammonium bicarbonate, ammonium hydroxide, or ammonium carbamate, or a mixture thereof.

4. The system of claim 1, wherein the third chemical reaction vessel comprises low pressure steam for stripping the $CO_2$ gas and regenerating the solvent.

5. The system of claim 1, further comprising a heat exchanger for facilitating energy transfer from high temperature lean solvent to low temperature rich solvent.

6. The system of claim 1, wherein the first chemical reaction vessel further comprises a water-soluble polymer.

7. The system of claim 6, wherein the water soluble polymer is PEG or PEI.

8. The system of claim 1, wherein the first chemical reaction vessel further comprises a water wash system and a condense system, for collection of amine and water from a treated gas stream.

9. The system of claim 1, wherein the second chemical reaction vessel operates at a temperature in the range of 20° C.~100° C.

10. The system of claim 1, wherein the second chemical reaction vessel further comprises apparatus selected from the group consisting of a unit of a rotating filter, a stationary filter, a cyclone, a hydrocyclone, and a sedimentation equipment for separation of the alkali metal bicarbonate.

11. The system of claim 1, wherein the system is configured such that slurry coming from the second chemical reaction vessel is pumped by a peristaltic slurry pump, or a centrifugal slurry pump.

12. The system of claim 1, wherein the second reaction vessel is placed right above the third chemical reaction vessel for slurry transfer to the third chemical reaction vessel by gravity.

13. The system of claim 1, wherein the third chemical reaction vessel produces concentrated alkali metal carbonate solution for amine and/or amino acid regeneration.

14. The system of claim 1, wherein the third chemical reaction vessel produces alkali metal carbonate solid, which is used for amine and/or amino acid regeneration.

15. The system of claim 1, wherein the third chemical reaction vessel comprises a heat exchanger.

16. The system of claim 1, wherein the system is further for capturing $SO_2$.

17. The system of claim 16, further comprising:
   a $SO_2$ absorber comprising an amine and/or amino acid salt, wherein the amine and/or amino acid salt is capable of absorbing the $SO_2$ to produce a $SO_2$-containing solution; and
   an amine regenerator comprising an aqueous alkali metal carbonate capable of forming an alkali metal sulfite/sulfate precipitate and regenerating the amine and/or amino acid salt.

18. The system of claim 16, further comprising: a fourth chemical reaction vessel comprising aqueous alkali metal carbonate, wherein the alkali metal carbonate is capable of absorbing the $SO_2$ to produce an alkali metal sulfite/sulfate precipitate and $CO_2$.

19. The system of claim 1, wherein two immiscible liquid phases form in the second chemical reaction vessel, an upper phase comprising amine solvent and a lower phase comprising alkali metal carbonate solvent.

20. The system of claim 4, wherein the third chemical reaction vessel has a temperature in a range from about 80° C. to 200° C., and a pressure in a range from about 100 kPa to 7 MPa.

21. The system of claim 1, wherein the amine and/or amino acid salt is sterically hindered amine.

22. The system of claim 21, wherein the sterically hindered amine is selected from the group consisting of 2-amino-2-methyl-1-propanol (AMP), 2-amino-1,3-propandiol, 2-amino-1-propanol, 3-methylmorpholine, 2-methylpyrrolidine, 2-ethylpyrrolidine, and mixtures thereof.

23. The system of claim 1, wherein the amine and/or amino acid salt is a secondary amine.

24. The system of claim 23, wherein the secondary amine is selected from the group consisting of pyrrolidine, 3-methylpyrrolidine, 3-ethylpyrrolidine, 1-(2-hydroxyethyl)piperazine, 1-(2-aminoethyl)piperazine, 1-methylpiperazine, 1-ethylpiperazine, 1-butylpiperazine, 2-methylpiperazine, 2-ethylpiperazine, 2-butylpiperazine, 2-methylpiperidine, 2-ethylpiperadine, 2-butylpiperidine), and mixtures thereof.

25. The system of claim 1, wherein the amine and/or amino acid salt is selected from the group consisting of glycine, alanine, lysine, serine, proline, piperazine-2-carboxylic acid, and mixtures thereof.

26. The system of claim 1, wherein the amine and/or amino acid salt is selected from the group consisting of 1-(2-hydroxyethyl)piperazine, 1-(2-aminoethyl)piperazine, 1-(2-ethoxyethyl)piperazine, 1-(2-methoxyethyl)piperazine, 1-(1,3-dioxolan-2-ylmethyl)piperazine, 1-(1-methyl-4-piperidinyl)piperazine, 1-[2-(2-hydroxyethoxy)ethyl]piperazine, 1-[2-(dimethylamino)ethyl]piperazine, 1-[3-(dimethylamino)propyl]piperazine, 1-methylpiperazine, 1-ethylpiperazine, 1-butylpiperazine, 1-decylpiperazine, 1-(4-hydroxybutyl)piperazine, 1,4-bis(2-hydroxyethyl)piperazine, 1,4-bis(3-aminopropyl)piperazine, 1-amino-4-(2-hydroxyethyl)piperazine, 1-methyl-4-(1-piperidin-4-ylethyl)piperazine, 1,4-bis(methyl)piperazine, 1,4-bis(ethyl)piperazine, 1,4-bis(butyl)piperazine, and mixtures thereof.

27. The system of claim 1, wherein the first chemical reaction vessel further comprises an absorption rate promoter.

28. The system of claim 27, wherein the rate promoter is selected from the group consisting of piperazine, 2-amino-2-methylpropanol (AMP), diglycolamine (DGA), ethanolamine (MEA), enzyme carbonic anhydrase, piperazine-2-carboxylic acid salt, amino acid salts from the group comprising glycine, alanine, serine, glutamine, proline, lysine, arginine, or histidine, and mixtures thereof.

29. The system of claim 1, wherein the first chemical reaction vessel further comprises an antioxidant, a corrosion inhibitor, a flocculation aid, or a mixture thereof.

30. The system of claim 1, wherein the first chemical reaction vessel is a random packing tower, a structure packing tower, a tray tower, or a spray tower.

31. The system of claim 1, wherein no precipitate is formed by the chemical reaction in the first chemical reaction vessel.

32. A method of capturing $CO_2$ from a stream of flue gas, comprising:
  (a) reacting $CO_2$ with an amine and/or amino acid salt to produce an amine-COO and/or amino acid-COO compound in a $CO_2$ containing solution without forming precipitate;
  (b) reacting the amine-COO and/or amino acid-COO compound with an alkali metal carbonate to thereby form an alkali metal bicarbonate precipitate and regenerate the amine and/or amino acid salt in a two-immiscible-aqueous-phase system; and
  (c) reacting the alkali metal bicarbonate precipitate in a thermal regeneration reaction to thereby regenerate the alkali metal carbonate and release $CO_2$.

33. The method of claim 32, wherein the reaction in operation (c) comprises reacting the alkali metal bicarbonate with an ammonium-based catalyst.

34. The method of claim 32, wherein the reaction in operation (a) occurs in a first reaction vessel and operation (b) occurs in a second reaction vessel, and wherein amine and/or amino acid salt regenerated in the second reaction vessel is recycled back to the first reaction vessel.

35. The system of claim 17, further comprising a fourth reaction vessel for precipitating out the alkali metal sulfite/sulfate precipitate.

36. The system of claim 19, wherein the upper amine solvent phase is fed to the first chemical reaction vessel, and the lower alkali metal carbonate solvent phase is fed to a fourth chemical reaction vessel for absorbing $SO_2$ to produce an alkali metal sulfite/sulfate precipitate and $CO_2$.

* * * * *